(12) United States Patent
Peters et al.

(10) Patent No.: US 8,203,099 B2
(45) Date of Patent: *Jun. 19, 2012

(54) METHOD AND DEVICE TO BUILD-UP, CLAD, OR HARD-FACE WITH MINIMAL ADMIXTURE

(75) Inventors: Steven R. Peters, Huntsburg, OH (US); Michael J. Morlock, Chesterland, OH (US); Bruce E. Fulmer, Mentor, OH (US); James E. Hearn, Brunswick, OH (US)

(73) Assignee: Lincoln Global, Inc., City of Industry, CA (US)

( * ) Notice: Subject to any disclaimer, the term of this patent is extended or adjusted under 35 U.S.C. 154(b) by 1015 days.

This patent is subject to a terminal disclaimer.

(21) Appl. No.: 11/861,379

(22) Filed: Sep. 26, 2007

(65) Prior Publication Data
US 2008/0006612 A1    Jan. 10, 2008

Related U.S. Application Data

(63) Continuation-in-part of application No. 10/861,958, filed on Jun. 4, 2004, now Pat. No. 7,304,269.

(51) Int. Cl.
*H05B 7/10* (2006.01)
*B23K 9/12* (2006.01)
*B23K 9/10* (2006.01)

(52) U.S. Cl. ........... 219/130.51; 219/130.1; 219/130.21; 219/130.31; 219/130.33; 219/130.5

(58) Field of Classification Search ............... 219/130.1, 219/130.5, 130.51, 130.21, 130.31, 130.32, 219/130.33
See application file for complete search history.

(56) References Cited

U.S. PATENT DOCUMENTS

| | | | |
|---|---|---|---|
| 3,519,780 A | 7/1970 | Potapievsky et al. |
| 3,683,149 A | 8/1972 | Mages |
| 4,438,319 A | 3/1984 | Blot |
| 4,717,807 A | 1/1988 | Parks et al. |
| 4,835,360 A | 5/1989 | Parks et al. |
| 4,866,247 A | 9/1989 | Parks |

(Continued)

FOREIGN PATENT DOCUMENTS

EP    0324960 A1    7/1989

(Continued)

OTHER PUBLICATIONS

European Search Report, EP 05004410, Munich, Sep. 7, 2005, Concannon, B.

(Continued)

*Primary Examiner* — Tu B Hoang
*Assistant Examiner* — Ayub Maye
(74) *Attorney, Agent, or Firm* — Hahn Loeser & Parks LLP

(57) ABSTRACT

An electric arc device and methods to build up, clad, join, or overlay an alloyed metal onto a parent metal with minimal admixture. The methods employed in the electric arc device provide a high frequency waveform with a high amplitude pulse, a low amplitude background current, and a special shorting routine, to alleviate the problem of generating too much ad-mixture. A fast transition from a peak current level to a background current level along with a shorting response and a plasma boost pulse reduces the droplet size and reduces the heat input required to achieve good welding performance.

19 Claims, 26 Drawing Sheets

U.S. PATENT DOCUMENTS

| | | |
|---|---|---|
| 4,889,969 A | 12/1989 | Kawai |
| 4,897,523 A | 1/1990 | Parks et al. |
| 4,954,691 A | 9/1990 | Parks et al. |
| 4,972,064 A | 11/1990 | Stava |
| 5,001,326 A | 3/1991 | Stava |
| 5,003,154 A * | 3/1991 | Parks et al. ............. 219/137 PS |
| 5,148,001 A | 9/1992 | Stava et al. |
| 5,192,851 A | 3/1993 | James et al. |
| 5,278,390 A | 1/1994 | Blankenship |
| 5,317,116 A * | 5/1994 | Tabata et al. ............. 219/130.51 |
| 5,742,029 A * | 4/1998 | Stava et al. ............. 219/137 PS |
| 6,008,470 A | 12/1999 | Zhang |
| 6,013,896 A | 1/2000 | Zhang |
| 6,025,573 A | 2/2000 | Stava |
| 6,051,810 A | 4/2000 | Stava |
| 6,074,022 A * | 6/2000 | Anderton et al. ............. 305/103 |
| 6,087,626 A | 7/2000 | Hutchison |
| 6,156,998 A * | 12/2000 | Takahashi et al. ....... 219/130.21 |
| 6,204,478 B1 | 3/2001 | Nicholson et al. |
| 6,215,100 B1 | 4/2001 | Stava |
| 6,498,321 B1 | 12/2002 | Fulmer |
| 6,501,049 B2 | 12/2002 | Stava |
| 6,515,259 B1 * | 2/2003 | Hsu et al. ................. 219/130.51 |
| 6,617,549 B2 | 9/2003 | Ihde |
| 6,717,107 B1 | 4/2004 | Hsu |
| 7,109,437 B2 | 9/2006 | Samodell |
| 7,109,439 B2 | 9/2006 | Stava |
| 7,148,449 B2 | 12/2006 | Myers et al. |
| 7,304,269 B2 | 12/2007 | Fulmer et al. |
| 2003/0071024 A1 * | 4/2003 | Hsu .......................... 219/130.01 |
| 2005/0269301 A1 | 12/2005 | Burrowes et al. |

FOREIGN PATENT DOCUMENTS

| | | | |
|---|---|---|---|
| GB | 2171267 A | | 8/1986 |
| JP | 57-19165 A | | 2/1982 |
| JP | 57019165 A | * | 2/1982 |
| JP | 58044964 A | | 3/1983 |

OTHER PUBLICATIONS

DeRunts, "Assessing the Benefits of Surface Tension Transfer Welding to Industry," Journal of Industrial Technology, vol. 19, No. 4 (Aug. 2003).

* cited by examiner

METHOD AND DEVICE TO BUILD-UP, CLAD, OR HARD-FACE WITH MINIMAL ADMIXTURE

CROSS-REFERENCE TO RELATED APPLICATIONS/INCORPORATION BY REFERENCE

This U.S. patent application is a continuation-in-part (CIP) of pending U.S. patent application Ser. No. 10/861,958, filed on Jun. 4, 2004, which is incorporated herein by reference in its entirety.

TECHNICAL FIELD

Certain embodiments relate to an electric arc device and methods of using an electric arc device. More particularly, certain embodiments relate to an electric arc device implementing methods to build-up, clad, or hard-face an alloyed metal onto a parent metal with minimal admixture.

BACKGROUND

Arc welding is quite often used as a method to build up, clad, or hardface metal objects, thereby placing a weld metal of a desired alloy onto the surface of another metal. Commonly, the composition of the clad or hardfacing material is significantly more expensive than the metal it is being placed on and therefore it is desirable to minimize the thickness of the weld metal. But in the process of welding, the cladding or hardfacing weld metal may be diluted by the base metal and more weld metal may be added to obtain the desired properties.

In other cases, the cladding or hardfacing weld metal, when applied directly to a base metal, may form an undesirable layer that may not survive in service. In such cases, an intermediate layer of weld metal may be added to avoid the formation of this undesirable layer. For example, when a copper/nickel cladding is added to a mild steel base plate, the mixture of the copper (from the cladding) and the iron (from the steel) may combine to form a layer that tends to be crack sensitive. In order to eliminate the intermediate layer, a low heat process such as GMAW-short arc transfer may be used. The copper/iron mixture layer (sometimes called admixture) is kept low enough to prevent cracking but this process is limited to the short arc transfer range and is, therefore, slow. When the procedure is increased to improve productivity, and a traditional GMAW-pulsed spray or GMAW-Spray transfer is used, the heat increases and the mixture of copper and iron increases to an undesirable level. Thus, there is a need for a high productivity, low heat input welding process to build up, hardface or clad with a minimum admixture.

Further limitations and disadvantages of conventional, traditional, and proposed approaches will become apparent to one of skill in the art, through comparison of such systems and methods with the present invention as set forth in the remainder of the present application with reference to the drawings.

BRIEF SUMMARY

A first embodiment of the present invention comprises a method of cladding or hard-facing an alloyed metal onto a parent metal with minimal admixture by generating a series of electric arc pulses between an advancing electrode comprising the alloyed metal and a workpiece comprising the parent metal. The method includes increasing an output current level over a first time segment while maintaining an arc between the advancing electrode and the workpiece and regulating the output current level to a peak current level over a second time segment while maintaining the arc between the advancing electrode and the workpiece. The method also includes decreasing the output current level from the peak current level toward a background current level in an attempt to induce a first short of molten metal between the advancing electrode and the workpiece and regulating the output current level to the background current level. The method further includes determining if the first short occurs and ramping the output current level above the background current level, if the short has been determined to occur, until the short is cleared. The method also includes pulsing the output current level over a third time segment to prevent a second short from occurring directly after clearing the first short. The method steps may be repeated at a pre-defined pulse repetition rate for the series of pulses.

Another embodiment of the present invention comprises an electric arc device used for cladding or hard-facing an alloyed metal onto a parent metal with minimal admixture by generating a series of electric arc pulses between an advancing electrode comprising the alloyed metal and a workpiece comprising the parent metal. The electric arc device includes means for generating a first current pulse, wherein the first current pulse has a peak current level and a pulse width. The electric arc device further includes means for inducing a first short of molten metal between the advancing electrode and the workpiece by reducing the peak pulse current level to about a background current level at a first rate. The electric arc device also includes means for generating a short clearing current segment after the first current pulse to clear the first induced short. The electric arc device further includes means for preventing a second short from occurring after the first short, and means for successively repeating the generating of the first pulse, the inducing of the first short, the generating of the short clearing current segment, and the preventing of the second short at a pre-defined rate of repetition.

These and other advantages and novel features of the present invention, as well as details of illustrated embodiments thereof, will be more fully understood from the following description and drawings.

DETAILED DESCRIPTION

Figure 1:
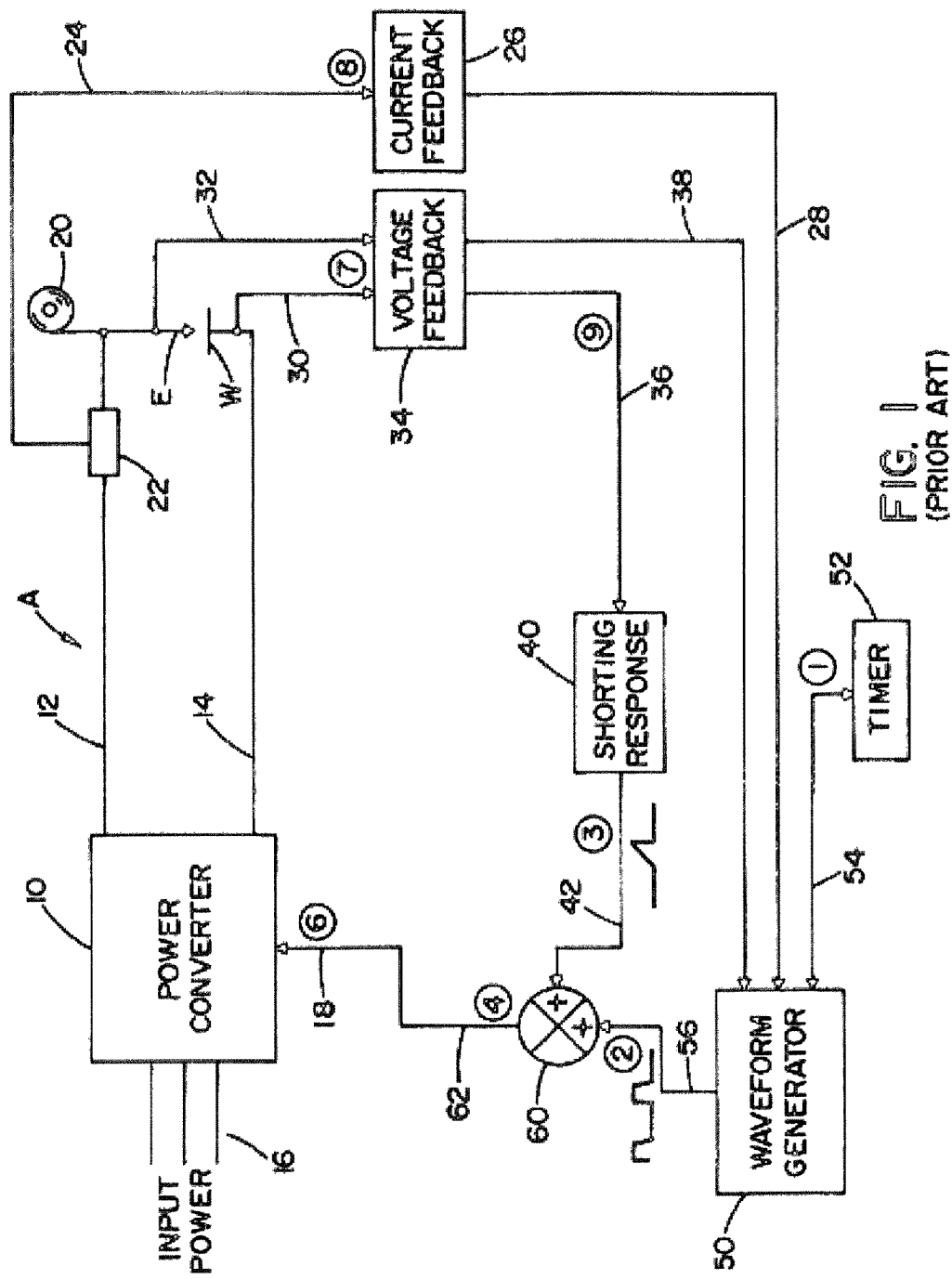
FIG. 1 is a combined block diagram and wiring diagram illustrating an electric arc welder for performing a pulse welding process in accordance with the prior art.
Figure 2:
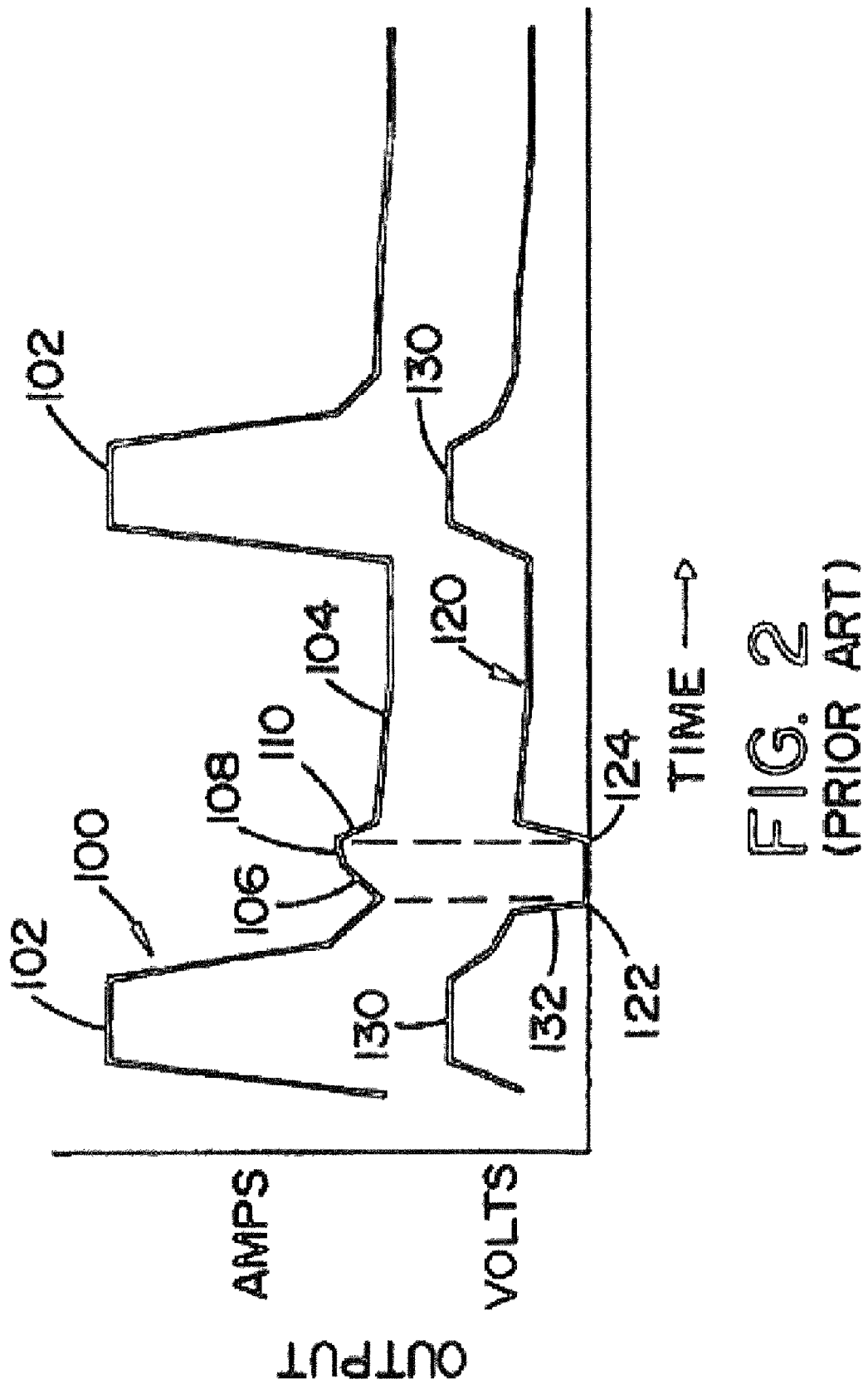
FIG. 2 is a graph illustrating a voltage curve and current curve of a prior art pulse welding process.
Figure 3:
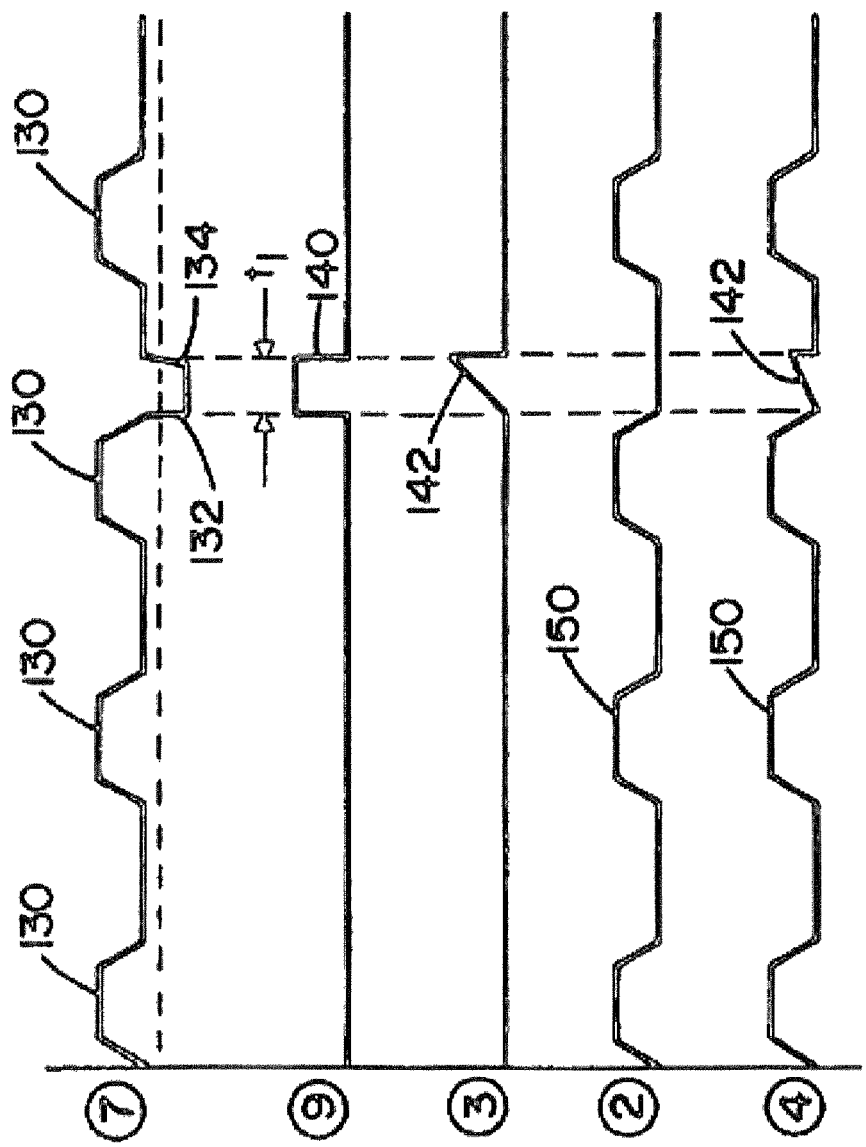
FIG. 3 is a graph illustrating the signals of various locations in the electric arc welder illustrated in FIG. 1.

Referring now to the drawings, wherein the showings are for the purpose of illustrating embodiments of the present invention only and not for the purpose of limiting same, FIGS. 1-3 illustrate a prior art electric arc welder A for performing a pulse welding process, as shown in FIG. 2. The prior art is illustrated since some of the components used in practicing embodiments of the present invention are essentially the same as standard components in electric arc welders. Although other welder architecture could be used, one architecture is a welder controlled by waveform technology as pioneered by The Lincoln Electric Company of Cleveland, Ohio. Two of many patents relating to waveform technology is described in Blankenship U.S. Pat. No. 5,278,390 and Fulmer U.S. Pat. No. 6,498,321, incorporated by reference herein as background information. In this type of welder, a waveform generator produces the profile for the waveforms used in a pulse welding process. The power source creates the pulses in accordance with the shape determined from the waveform generator by using a plurality of current pulses and at high frequency such as over 18 kHZ. This type of technology produces precise pulse shapes for any desired welding process. Even though the embodiments herein will be described with respect to the use of a welder employing waveform technology, the present invention is broader and may be used in other welders, such as SCR controlled welders and chopper based welders.

Electric arc welder A shown in FIG. 1 is used to perform a standard pulse welding process as illustrated by the curves in FIG. 2 with a plurality of operating signals indicated at various locations in FIG. 1 and by corresponding numbers in FIG. 3. Before addressing embodiments of the present invention, background matter as it relates to the prior art shown in FIGS. 1-3 will be considered. Electric arc welder A has a power source 10 in the form of a high speed switching inverter with output leads 12, 14 for creating the pulse welding process between electrode E and workpiece W. Power source 10 is driven by an appropriate power supply 16, illustrated as a three phase input. The profile of the pulses and separating background current constituting the pulse welding process is determined by a signal on wave shape input 18, in accordance with standard technology. Current shunt 22 communicates the arc current of the welding process by lines 24 to a current sensor 26 having an analog output 28 used for a feedback control loop. In a like manner, leads 30, 32 communicate the arc voltage to voltage sensor 34 having a detect output 36 and a level or amplitude output 38. The detect output indicates when the level of voltage plunges during a short circuit between electrode E and workpiece W. Level output 38 has a signal representative of the arc voltage across the electrode and workpiece. Voltage detect output 36 is directed to a shorting response circuit 40 having an output 42 which outputs a signal 3, as shown in FIG. 3. When there is a short circuit, there is a detect signal in line 42 in accordance with standard technology. Waveform generator 50 is loaded with the particular waveform to perform the welding process. This waveform is indicated as signal 2, shown in FIG. 3. Timer 52 directs a timing signal by lines 54 to waveform generator for the purpose of initiating the individual pulses constituting the welding process. Generator 50 also has feedback signals from lines 28, 38 to control the voltage and current in accordance with the set profile of the waveform generator and the existing profile between the electrode and workpiece. The waveform that is to be outputted by power source 10 is signal 2 in line 56. This signal is connected to the input of summing junction or adder 60 having an output 62 for signal 4. This signal, in the prior art welder A, is the actual signal directed to input 18 of power source 10. The welding process performed by welder A is illustrated in FIG. 2 wherein current curve 100 has a series of spaced current pulses 102 separated by background current portion 104. Voltage curve 120 is the voltage between lines 30, 32 and constitutes the arc voltage correlated with the arc current of curve 100. The peak voltage is a result of applying peak current 102. A low average voltage of curve 120 is due to a high instantaneous arc voltage average with a shorting or below about 6.0 volts. When there is a short circuit, arc voltage 120 plunges as indicated by point 122. This voltage plunge indicates a short circuit of molten metal between the electrode and workpiece. When that occurs, a clearing procedure overrides the waveform shape in line 56. Upon detection of a short circuit at point 122, a high current is applied between the electrode and workpiece along ramp 106 shown in FIG. 2. In practice, this ramp is steep and then becomes gradual as indicated by portion 108. When the short circuit is cleared by the increased current, in accordance with standard technology, the voltage of curve 120 immediately shifts back to a plasma or arc condition. This causes a tail out or recovery of the current along line 110. Consequently, when there is a short circuit, arc current is increased along ramp 106 and ramp 108 until the short is cleared, as indicated by an increased voltage. This removal of the short circuit, stops the output of shortening response circuit 40. The operation of welder A is disclosed by the signals 2, 3, 4, 7 and 9 as shown in FIG. 3. Signal 7 is the sensed voltage in line 36. Under normal circumstances, voltage 120 includes a plurality of spaced pulses 130 having shapes determined by waveform generator 50 and spacing determined by timer 52. When there is a short at point 122, the voltage plunges along line 132. This causes a pulse 140 that generates an output in line 42 which output is in the form of signal 142 generally matching ramp 106 for the current curve 100 that is added to signal 2. The output of waveform generator 50 is signal 2 constituting the waveform signal 150 shown in FIG. 3. The output of summing junction 60 in line 62 is the summation of signals 2 and 3 which is shown as signal 4 in line 62. Ramp 142 is added to waveform 150 so that the output between electrode E and workpiece W is the signal in line 18 controlling the inverter type power source 10. This is a representation of a standard prior art welder which is modified herein to provide rapid movement of the electrode with a reduced arc length and reduced spatter.

Figure 4:
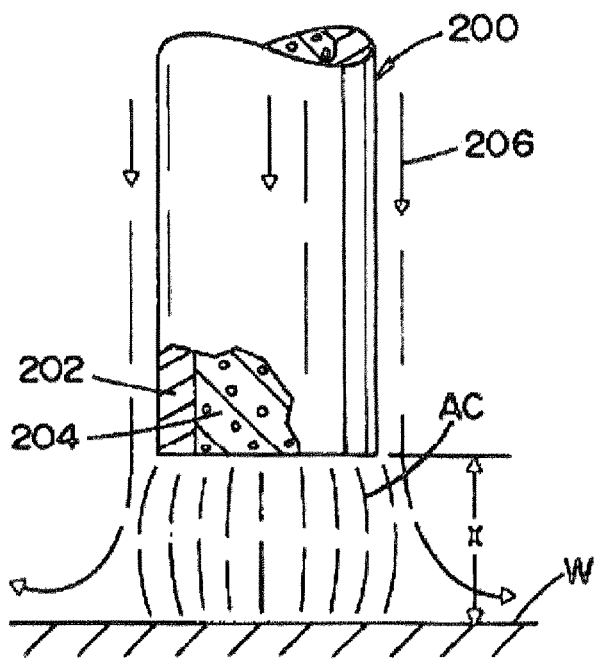
FIG. 4 is an enlarged partially cross-sectioned view of an electrode with a core and an external shielding gas used in embodiments of the present invention.
Figure 5:
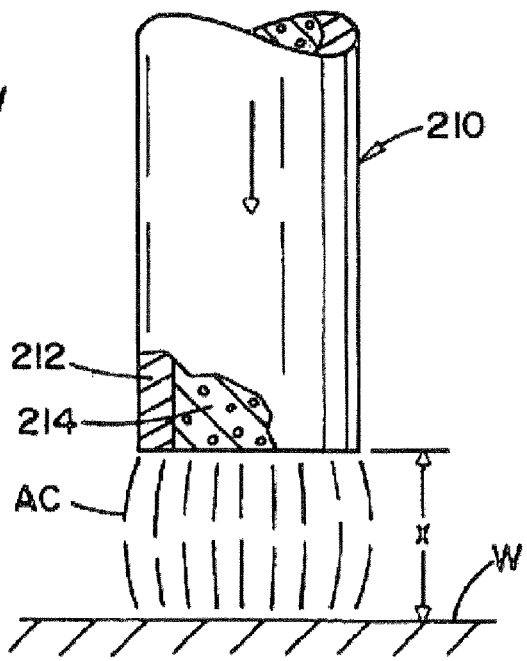
FIG. 5 is a view, similar to FIG. 4, illustrating a flux cored electrode with a self shielding core and usable in embodiments of the present invention.
Figure 6:
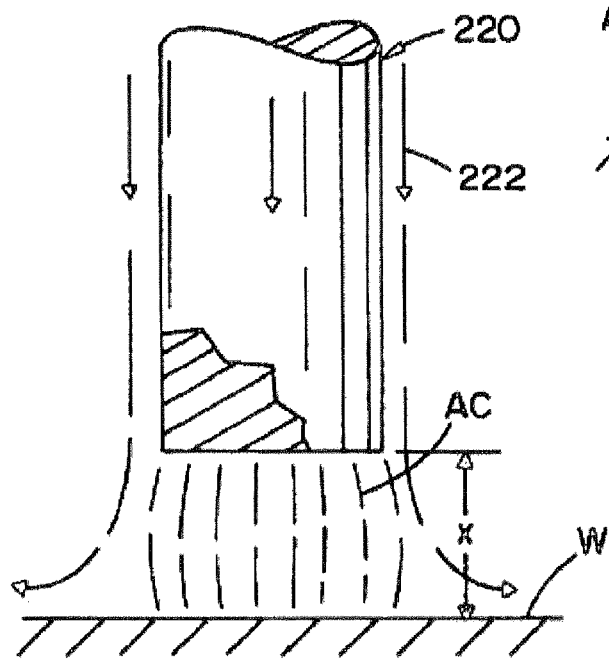
FIG. 6 is a view, similar to FIGS. 4 and 5, showing a solid wire electrode with an external shielding gas as normally used in the prior art electric arc welder of FIG. 1.

By using embodiments of the present invention, the pulse welding process can be shifted from a high voltage process with an arc voltage, in a range greater than 26-27 volts, to a low voltage process where the arc voltage is less than 25 volts and specifically in the general range of 17-22 volts. With this low voltage made possible by using embodiments of the present invention, the arc is stable with a very short arc length below about 0.20-0.30. At about 22 volts and 200 amperes the arc length is about 0.15 inches steel wire with 90% argon and 10% $CO_2$. This allows a faster travel rate while still maintaining a good bead profile. Other wires can be used, such as aluminum or stainless steel. Three different electrodes used in embodiments of the present invention are illustrated in FIGS. 4-5. In FIG. 4, cored electrode 200 is advanced in the direction of the arrow and includes an outer steel sheath 202 and an inner core 204 formed from alloy agents and other compounds necessary for providing the desired weld metal in the weld bead. As an arc or plasma AC is created between the electrode and workpiece W, shielding gas 206 is directed around the arc to protect the arc from atmospheric contaminants. The arc length x is a length less than 0.30 inches and is created by voltage in the general range of 17-22 volts. This type of electrode is well suited for use in embodiments of the present invention. Another cored electrode is shown in FIG. 5, where electrode 210 has an outer sheath 212 and an inner core 214. This electrode is a self-shielding electrode where the composition of core 214 provides fluxing agents and other compositions to protect the molten metal as it is transferred through the arc and onto the workpiece W. Again, this cored electrode is useful in practicing embodiments of the present invention wherein cored electrodes in the past have not been successfully employed for pulse welding. FIG. 6 shows solid wire electrode 220 with shielding gas 222. This is the normal wire heretofore used in pulse welding. This type electrode is the electrode normally used in MIG welding and particularly in pulse welding. By using embodiments of the present invention, electrodes 200, 210 and 220 can now be used in pulse welding. Thus, embodiments of the present invention take advantage of metallurgical and physical attributes of cored electrodes in pulse welding. The advantages of a cored electrode for STT welding is discussed in Stava U.S. Pat. No. 6,071,810 incorporated by reference herein as background information. Cored electrodes can be used because embodiments of the invention provide low voltage so the voltage range for the welding process by cored electrodes is extended. When using solid wire as illustrated in FIG. 6, the low voltage allows the wire to travel faster. By using embodiments of the present invention, all of the electrodes shown in FIGS. 4-6 can be used according to the demands of the welding process. In the past high arc voltages prevented effective uses of all types of electrodes. Since embodiments of the present invention allow very low arc voltage, the arc length is small and the molten metal often transfers to the workpiece by a short circuit. This process makes use of cored electrodes, especially metal cored electrodes, very acceptable for pulse welding. Indeed, a metal cored electrode with about 0.010 to 0.030 sulfur in the core have been proven extremely effective when obtaining the general advantage of the plasma boost pulse concept described herein. Wire electrodes, Metal Shield MC6 and MC 706 sold by The Lincoln Electric Company of Cleveland, Ohio have proven to be advantageous for use with a method using a plasma boost pulse where the shielding gas 75-95% argon with the balance $CO_2$ gas. These wires conform to the E70C-6M designation. Other metal cored electrodes and self shielding cored electrodes have taken advantage of the low voltage, low arc length obtainable in a process performed in accordance with embodiments of the present invention.

Figure 7:
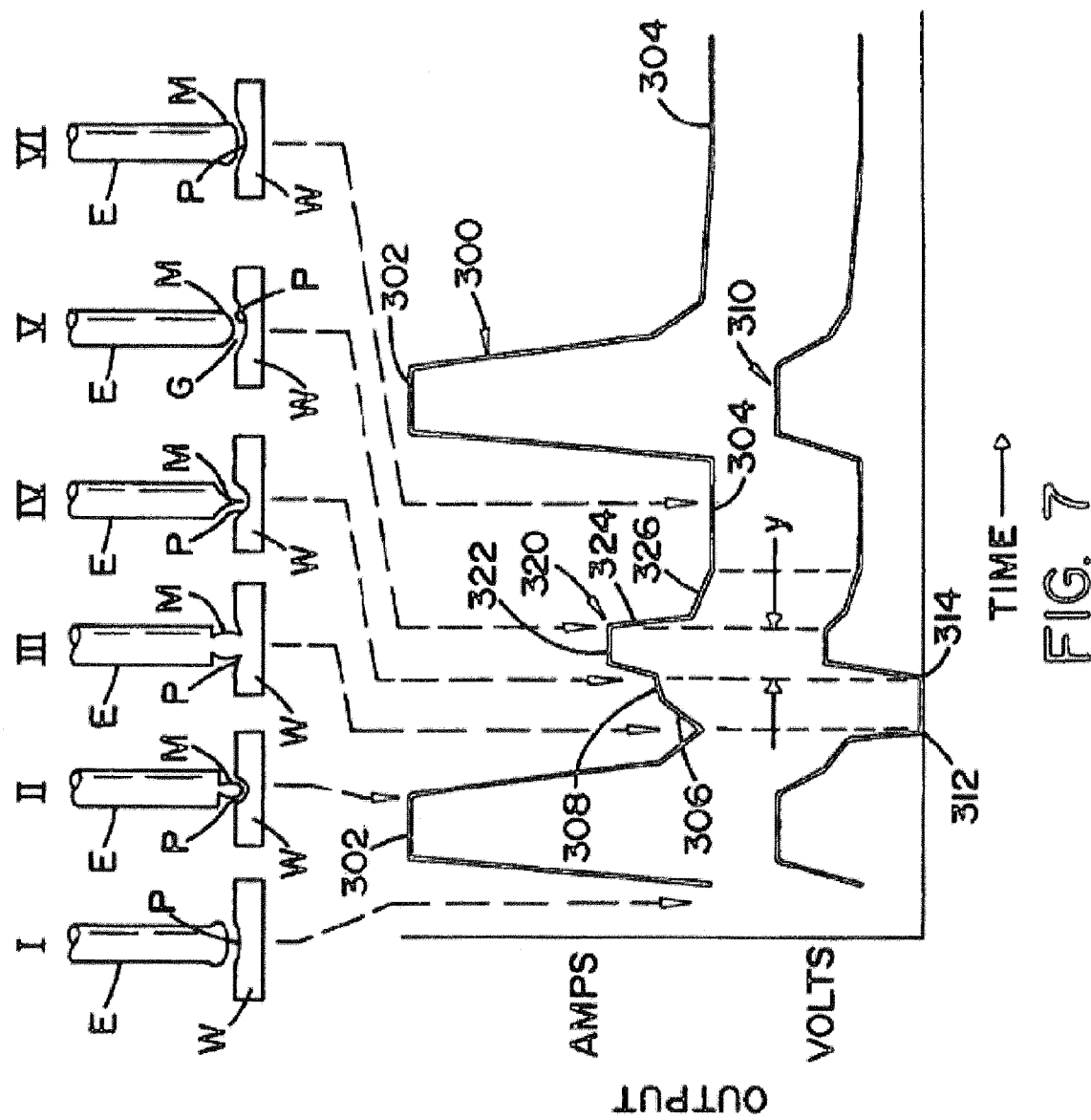
FIG. 7 is a graph with a voltage curve and a current curve illustrating the pulse welding process in accordance with an embodiment of the present invention and containing pictorial representations of electrode and workpiece at various stages in the welding process.
Figure 8:
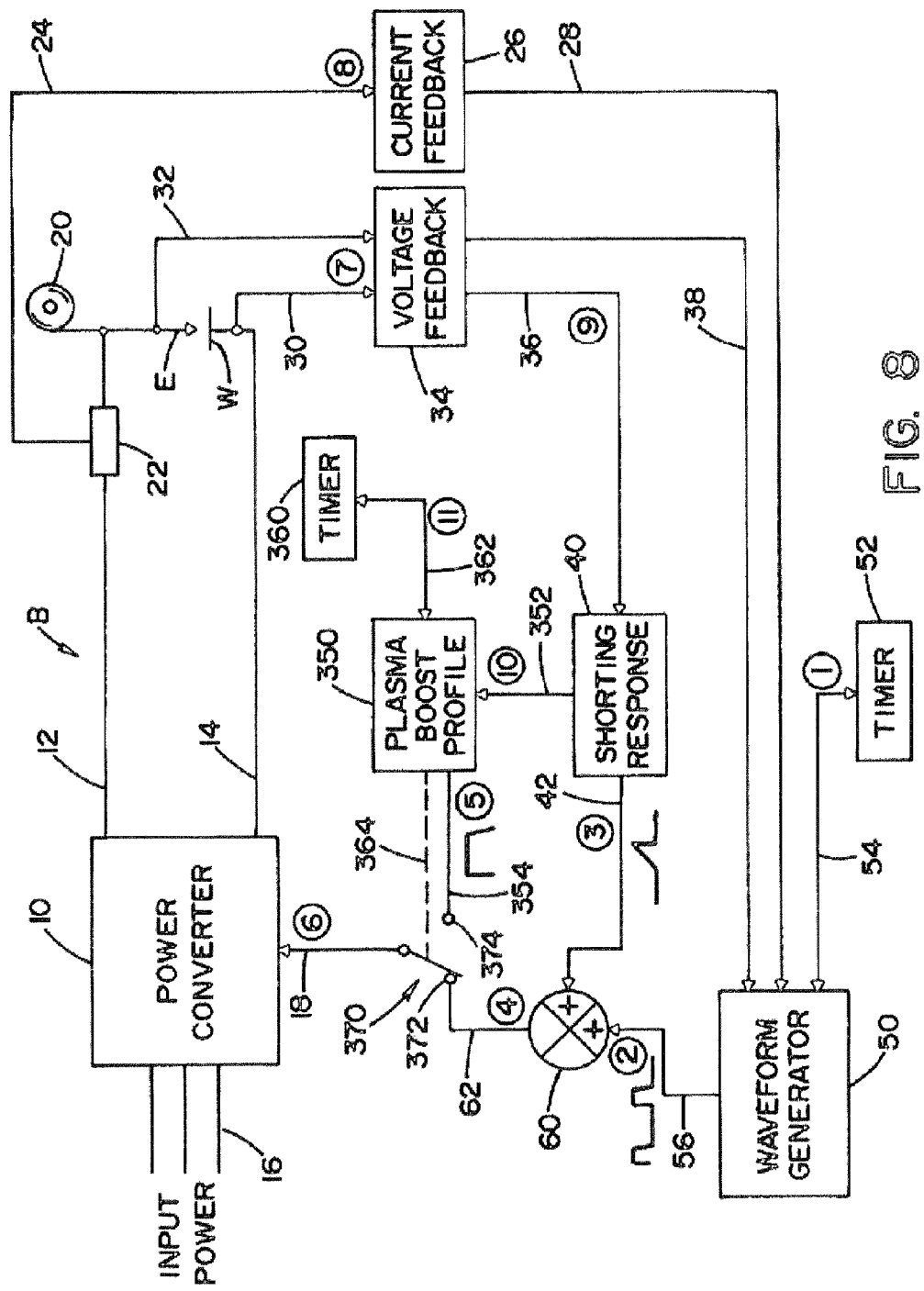
FIG. 8 is a combined block diagram and wiring diagram showing an electric arc welder for performing the pulse welding process illustrated in FIG. 7.
Figure 9:
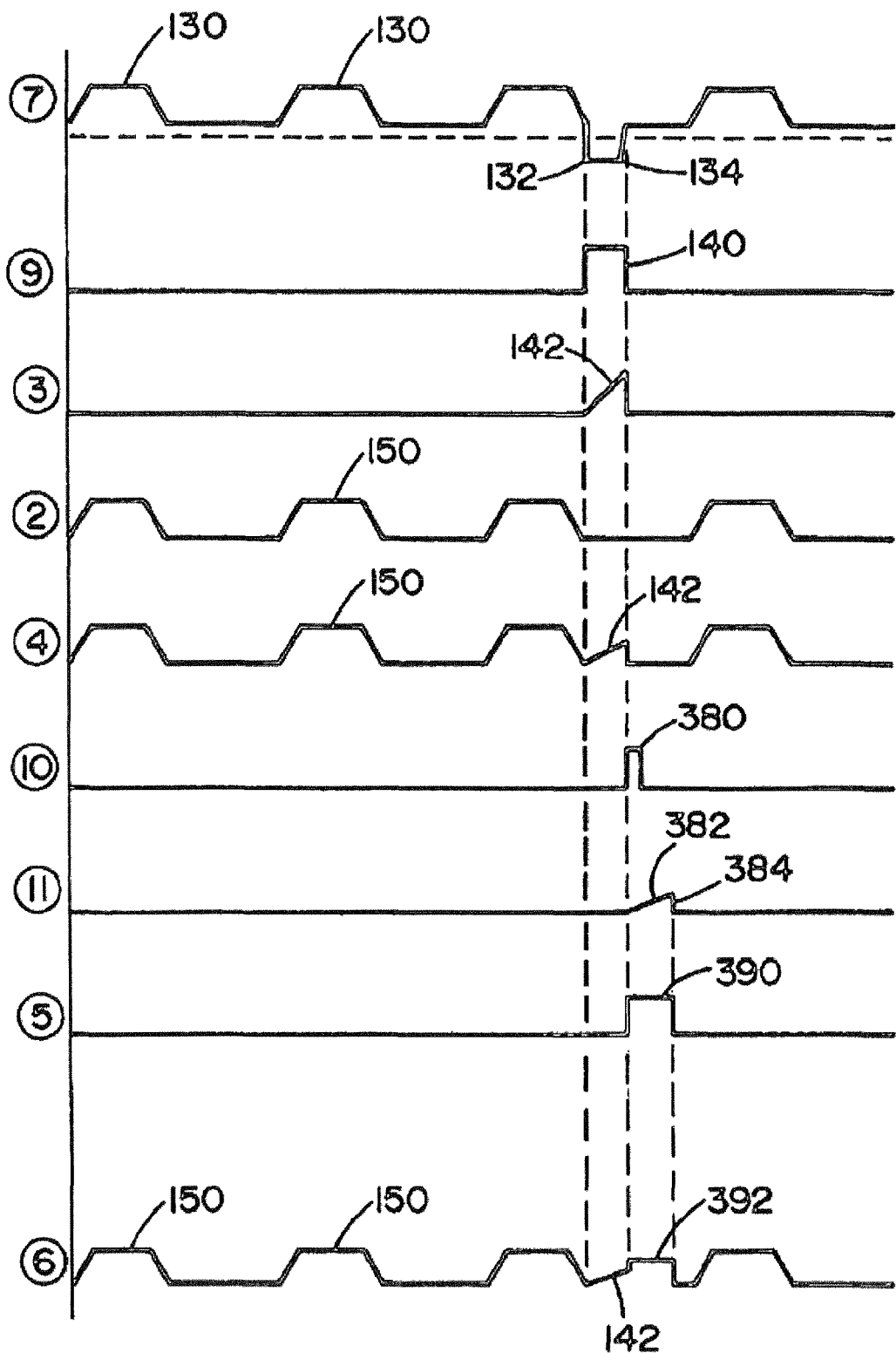
FIG. 9 is a graph showing the signals at various locations in the electric arc welder shown in FIG. 8.

An embodiment of the present invention is illustrated in FIGS. 7-9 that produces the pulse welding method best shown in FIG. 7. Current curve 300 includes spaced pulses 302 separated by background portions 304 determined by the output of waveform generator 50 with the pulses spaced by the output of timer 52. Of course, timing can be built into the program of the waveform generator. Background current 304 is provided between pulses 302 for use in keeping the arc lit after molten metal M has been formed and deposited onto the workpiece in the molten metal weld puddle. Voltage curve 310 includes a short circuit detect point 312 and a short circuit clear point 314. Curve 300 shows the normal high current clearing routine to generate portions 306, 308 corresponding to portions 106 and 108, respectively, of the prior art shown in FIG. 2. The embodiment involves the provision of a plasma boost pulse 320 after the short circuit clear point 314 so the boost pulse occurs during an arc condition or a plasma condition. In practice, this plasma pulse is created during an interrupt of the output from waveform generator 50 and is substituted for the output of the generator at input 18 of power source 10. Plasma boost pulse 320 is a regulated power in the general range of 5-20 KW and preferably less than about 10-15 KW. For aluminum, the power may be as low as 1.0 KW. This pulse has a peak portion 322 that has a time distance y which is generally less than 5.0 ms and preferably in the range of 0.2-5.0 ms. In the present implementation, the time is 0.3 ms. Pulse 320 is terminated at the end of the peak portion 322 to enter a current reduction section where the arc current falls to background current level 304. In an embodiment, this reduction in current is a long trailing edge 324 and a generally gradual tail out portion 326 so the plasma boost pulse is terminated before 5.0 ms. The operation of the plasma boost is depicted in the pictorial representations I-VI at the top of FIG. 7. Electrode E advances toward workpiece W while molten metal M is forming as shown at position I. The current between the electrode and workpiece is then increased to peak of pulse 302 causing the end of electrode E to melt further and produce a molten metal ball M. The operation of peak 302 is at position II. Workpiece W involves a molten metal puddle P which is cavitated by the arc force between electrode E and workpiece W. After position II, in normal pulse welding, the molten metal M at the end of electrode E is transferred through the arc to the puddle P during the background portion 304 of the process. Then the process is repeated as shown in position VI. A short circuit between electrode E and puddle P by molten metal M is not formed as a part of a normal pulse welding operation. When a short circuit occurs as shown at position m, the arc voltage is plunged at point 312. The short circuit then initiates a high current clearing routine or sequence represented by portions 306, 308 to neck off and separate molten metal M from electrode E as shown in position IV. Then an embodiment of the present invention is implemented. At the clearance of the short circuit represented by a rapid rise in voltage at point 314 a plasma boost pulse is outputted. The plasma boost pulse force puddle M away from electrode E as shown at position V. This high arc force cavitates puddle P drastically to assure a separation between molten metal M and molten puddle P. This assures that there is no incipient short or short circuit until after the next pulse 302. After pulse 320 shown at position V, the low background current portion 304 is implemented by waveform generator 50. This allows the puddle P of workpiece W to become quiescent so that the cavitation is decreased in a manner illustrated at position VI. By using an embodiment of the present invention as shown in position V, a substantially larger spacing or gap G is provided between the end of electrode E and puddle P of workpiece W. This large gap is the result of the plasma boost pulse following the necking and rupture of the short circuit. Embodiments of the present invention allow lower voltages, faster operation and uniform weld beads with low spatter. Creation of the arc forced gap controls the shape of the molten metal in the puddle directly under the electrode as the short circuit has been cleared. Position V represents a primary advantage obtained by using a plasma boost pulse following a short circuit in a pulse welding operation. It is possible to use only plasma boost pulse to both clear a short circuit, as well as force the puddle into a large arc force cavitation shown in position V. However, this can increase spatter. So clearing of the short circuit is desired. Since the short circuit is cleared and followed by a high power plasma boost pulse, the short circuit event is no longer disruptive of the pulse welding process. As will be shown later, the existence of periodic short circuits may be beneficial and are surely rendered less detrimental.

The pulse welding process with a plasma boost pulse is performed by electric arc welder B shown in FIG. 8. The same functional components as used in welder A, shown in FIG. 1, with the same number and same signals are used in welder B. To practice the embodiment of the present invention, welder B is provided with a plasma boost profile circuit 350 having a start interrupt signal in line 352 with the short circuit is cleared at point 314 in FIG. 7. A signal in line 352 when the point 314 is reached is communicated to timer 360 by line 362. This starts timer to create an interrupt time. This interrupt signal in line 362 continues until timer proceeds to its set time. The signal in line 362 from timer 360 sets the duration of the interrupt during which the plasma boost profile circuit 350 is operated. Output 354 processes the boost pulse profile during the interrupt when the interrupt signal in line 364 shifts switch 370 from the normal contact 372 and the interrupt contact 374. When timer 360 holds switch 370 in the interrupt position at 5 contact 374 plasma boost circuit 350 outputs a profile signal in line 354 so long as timer 360 is timing to give a signal in line 364. This profile is the plasma boost pulse 320 shown in FIG. 7. Of course, switch 370 is a digital software switch to shift from the output 62 of summing junction 60 to the interrupt position while circuit 350 processes a profile indicated as signal 5. This signal is directed to input 18 of power source 10. The various signals are shown in FIG. 9 with the numbers corresponding to the signals in FIG. 3. The new signals 5, 6, 10 and 11 are shown in the lower portion of FIG. 9 and are coordinated in time with the other signals previously described. When the short circuit has been cleared, shorting response circuit 40 creates signal 10 in line 352, which signal is a pulse 380. This pulse starts the timing signal 11 which is a ramp signal 382 having a time out position 384. As long as timer 360 is timing, an interrupt signal 390 is maintained while the plasma boost profile in line 354 is processed by power source 10. During the interrupt and signal output indicated by pulse 390, the control voltage on input line 18 is in the form of pulse 392 shown as signal 6. In practice, it is beneficial when the short circuit is formed (point-312 of FIG. 7) at a low current which will minimize any spatter created. Since the cross section of the short circuit is minimal, only a minimal increase in current by the shorting ramp is required to clear the short circuit. The short clears at a relatively low current resulting in minimal spatter created by the release of the short.

By using the embodiment of the present invention as shown in FIGS. 7-9, a plasma boost is provided after the normal short circuit clearing routine has been performed by shorting response circuit 40 in accordance with standard practice. In accordance with a broad aspect of the present invention, the plasma boost pulse can replace the short clearing routine; however, this is not a desired implementation. The standard pulse program from waveform generator 60 can be modified to improve the shorting events and improve the response to the short circuits so the events are not disruptive. These modifications include a fast transition from the low background current to the high peak current at the leading edge of pulse 302. This quickly increases the output to a level above the transition current to start melting of a droplet on the end of the electrode. Then, a fast transition from the high peak current of pulse 302 to the low background current 304 can be provided. This quickly reduces the arc force between the droplet and the puddle. As this arc force is removed, the puddle and droplet can short easily. The transition from the peak current to the background current 302 will short more often and positively if the initial transition overshoots the background current slightly. Thus, the trailing edge of pulse 302 transitions to a current slightly below the background current 304. This aspect is disclosed in more detail later when discussing FIG. 22. As illustrated in FIG. 7, the shorting response is a multi-ramp response that minimizes the initial response to the short circuit for separating incipient shorts and then increases the current response for clearing harder shorting events. This method has been used for many years in the Power Wave 455 manufactured by The Lincoln Electric Company when processing standard CV programs.

Figure 10:
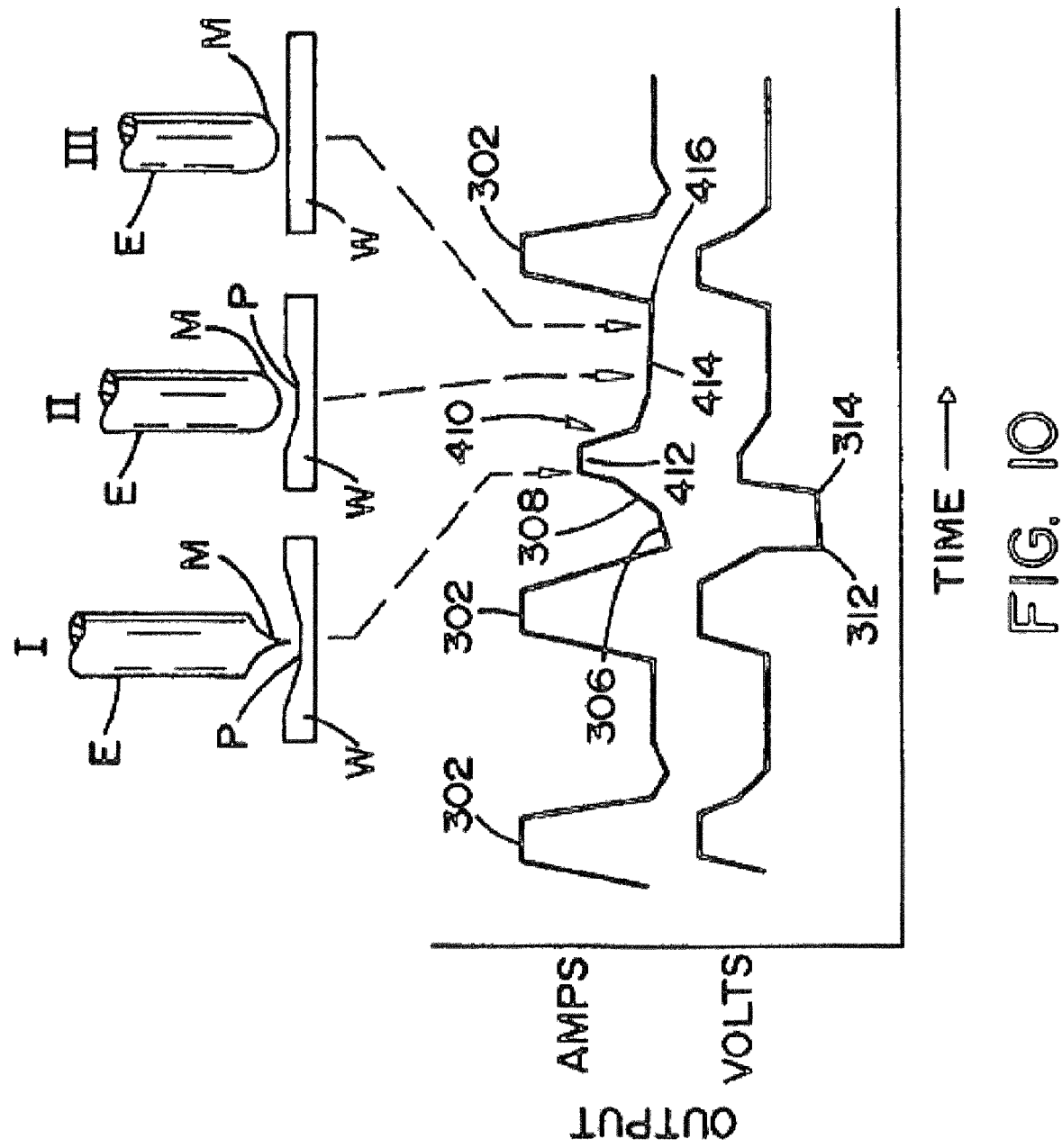
FIG. 10 is a graph containing a voltage curve and current curve of a pulse welding process including an addition to the embodiment of FIG. 7 of the present invention with pictorial representations of various stages performed by this addition.
Figure 11:
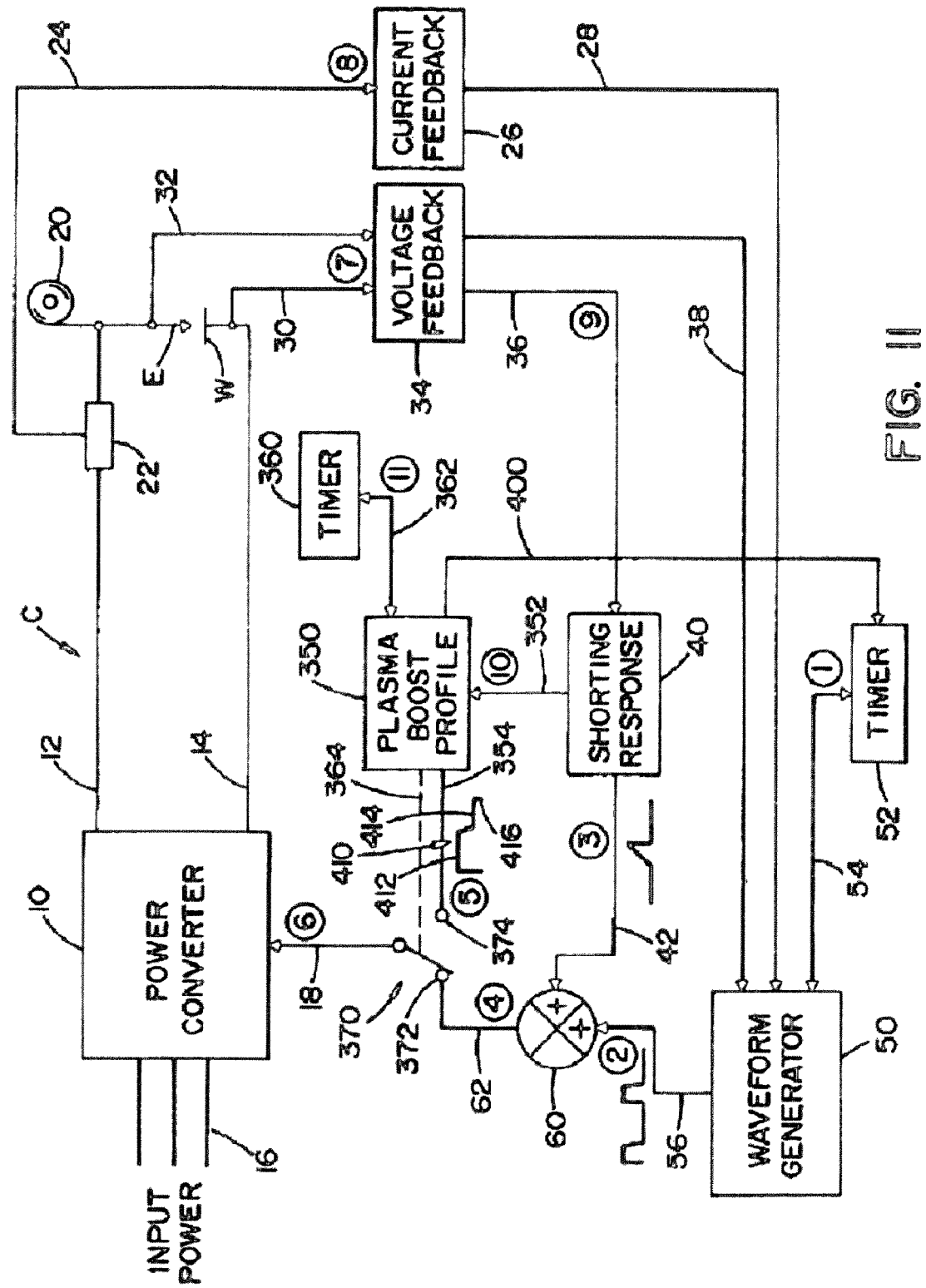
FIG. 11 is a combined block diagram and wiring diagram of an electric arc welder for performing the pulse welding process illustrated in FIG. 10.
Figure 12:
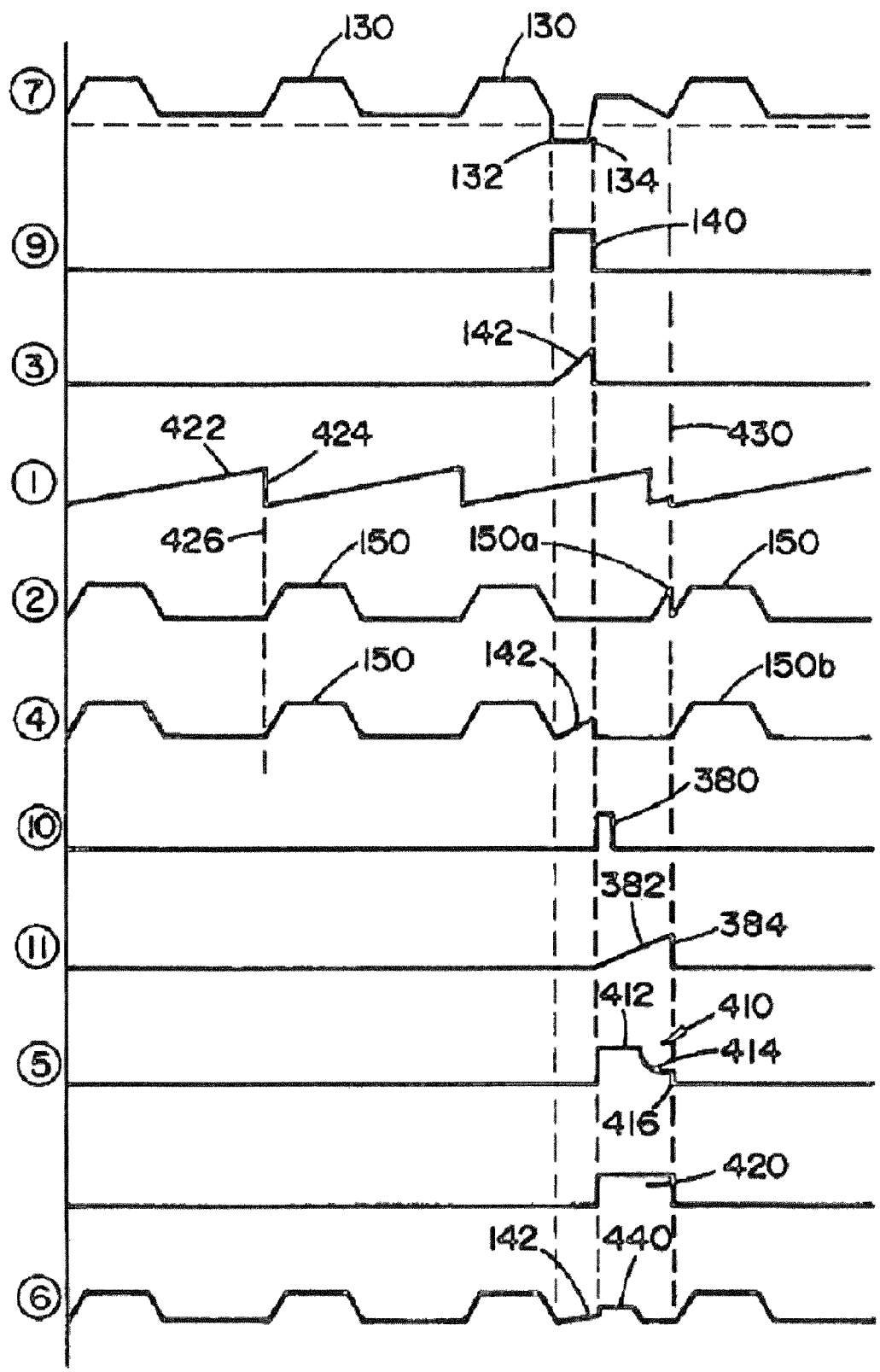
FIG. 12 is a graph showing signals at various locations in the electric arc welder illustrated in FIG. 11.

An addition can be made an embodiment of the present invention as illustrated in FIGS. 10-12 wherein the plasma boost pulse or routine is modified to promote consistent detachment of the molten metal. The plasma boost creates a molten droplet on the end of the electrode that will be transferred during the next pulse cycle. Once the plasma boost pulse is completed, the standard pulse waveforms are resumed. However, a short circuit will not occur at the same time for each of the pulses in the pulse welding process. Furthermore, the time required to clear a short is inconsistent from one short to the next. Consequently, the time the short clears in relationship to the next pulse determined by timer 52 will not be consistent. The remaining time after the plasma boost pulse is completed will be different when utilizing the embodiment of the present invention. It is presumed that the background current 304 has sufficient time in the waveform created by waveform generator 50 to allow the electrode to travel closer to the puddle before the molten metal is transferred. This time is inconsistent from one short to the next for the reasons stated. Consequently, the position at the end of the electrode with respect to the puddle will not be consistent. A method for improving this consistency allows the end of the electrode to travel a consistent distance before the next pulse. This improvement in the basic embodied method of the present invention uses a dedicated background time and amplitude routine after the plasma boost itself has been processed. The waveform creating the plasma boost pulse is modified to include its own background current portion after the pulse. Consequently, timer 360 is used to control the duration of the plasma boost pulse and the background current time and magnitude. The plasma boost pulse serves to build a consistent droplet on the end of the electrode at a consistent distance from the puddle as shown in the top pictorial representations of FIG. 10. In order to maintain this consistent operation before the next pulse, a consistent time and amplitude for the background segment or portion is used in the modification of the embodiment. This modification is shown in FIGS. 10-12. The plasma boost pulse is expanded to include a dedicated background amplitude and time. Timer 360 is used to set the time starting with the short circuit clearance signal appearing on line 352. In accordance with this modification, electric arc welder C shown in FIG. 11 is modified to reset timer 52 at the end of the interrupt during which line 354 controls input 18. The reset signal is a signal on line 400. During the interrupt, plasma boost circuit 350 creates a signal 5 to generate a waveform 410 having a plasma boost pulse portion 412 and a background current portion 414 terminating at time 416. This is the time out of timer 360 to create a reset signal in line 400. When timer 360 starts its timing sequence, there is an interrupt shown as pulse 420 in FIG. 12. This is the same interrupt as previously described. Timer 52 times along line 422 as shown in FIG. 12. At position 424, timer 52 resets causing a signal at time 426 in line 54 to start the next pulse 150 in signal 2 of generator 50. In accordance with this embodiment of the present invention, welder C creates a reset signal in line 400 when timer 360 reaches its set time at the end of the tailout section 414 at the plasma boost waveform 410. This reset signal is at time 430 shown in FIG. 12. Reset signal 1 terminates pulse 150 of signal 2 at the end of the plasma boost portion of waveform 410 to create a partial pulse 150a shown in FIG. 12. This then initiates the next pulse 150b of signal 4 shown in FIG. 12. During interrupt 420, a waveform 410 is created by circuit 350 on line 354. This waveform during the interrupt has a precise profile for the plasma boost pulse 412 and the background current portion or segment 414. Immediately after that background current portion has been implemented by power source 10, the next pulse 150b is caused to proceed. Consequently, when there is a short circuit there is a precise pulse and tail out or background current amplitude and time. This is shown in FIG. 10. The signal on line 18 by the interrupt position of switch 370 is a waveform 410 with pulse portion 412 and background current portion 414. A signal in line 400 occurs at time 416. This is when the predetermined waveform of the interrupt has been completed. Consequently, elements 412, 414 and 416 are consistent with each short. Thereafter, a new pulse 302 is initiated by timer 52. A signal 6 shown in FIG. 12 is applied to input 18 for controlling the profile of the current or power between electrode E and workpiece W. The new profile is profile 440 in FIG. 12. Consequently, the output of waveform generator 50 is interrupted at the end of the short and a given pulse and background current segment is processed. The result of this waveform is shown in positions I-III in FIG. 10. Upon creation of portion 412, the arc force pushes puddle P so it moves away from the end of electrode E. This is shown at position I. Thereafter, the background current portion allows puddle P to reform in a uniform manner. This is shown at position II. At the end of the profiled waveform 410, the molten metal M is ready to be transferred to workpiece W as shown at position III. This creates a consistent operation after each short circuit. Such modification improves the quality of the weld while still maintaining the advantages of using a plasma boost pulse at the end of the short circuit. Consequently, the plasma boost signal includes a dedicated background portion 304 with a selected amplitude and duration, which is at a different level than level 414 in FIG. 10. The interrupt signal is maintained through waveform 410 including plasma boost pulse 412 and dedicated background portion or segment 414. Timer 52 is reset at the end of a dedicated background time. During the dedicated background portion, the waveform generator is ignored because the interrupt has switched control of input 18 to the output of plasma boost control circuit 350. The waveform generator is reset by timer 52.

Figure 13:
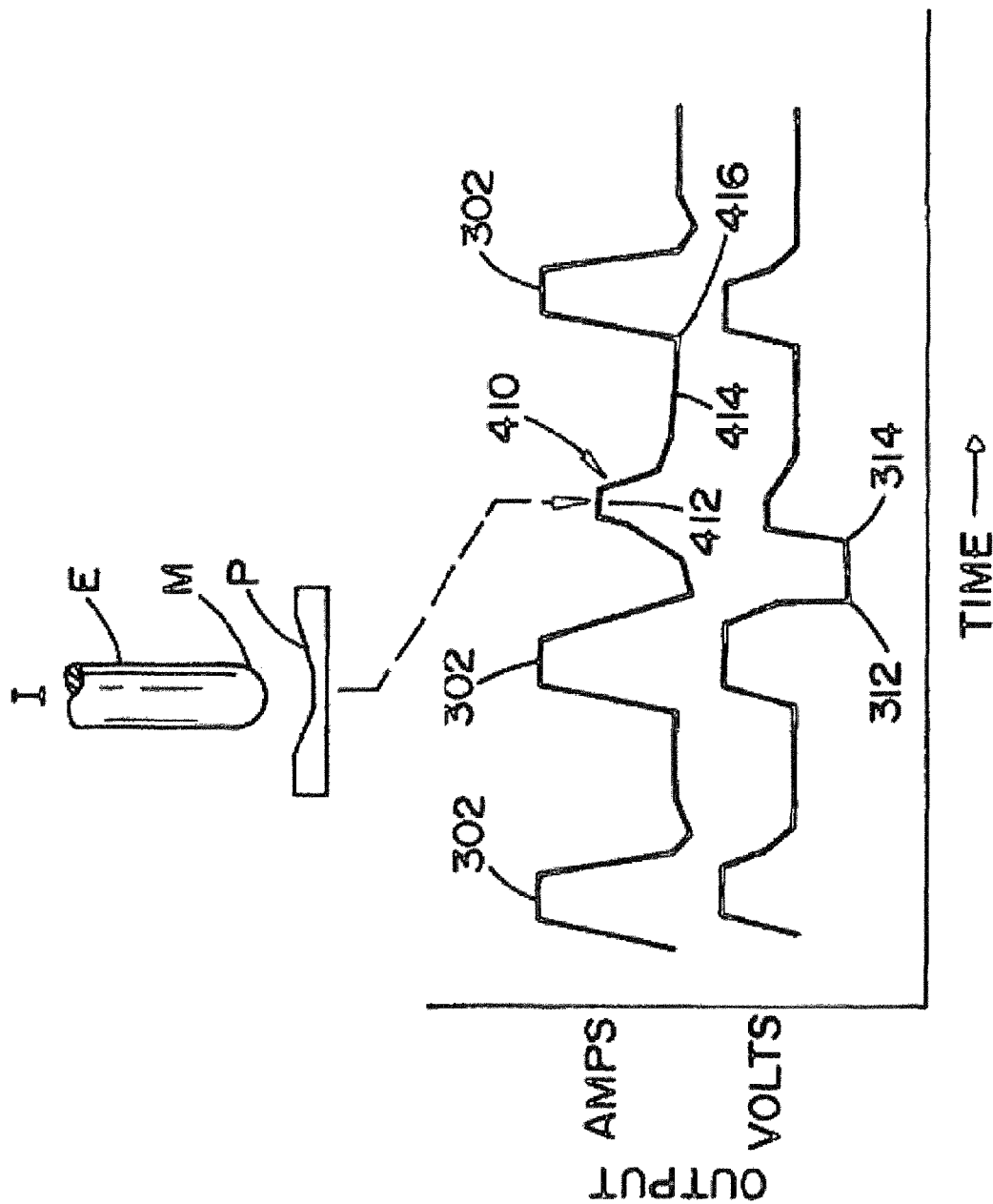
FIG. 13 is a graph with a voltage curve and current curve of a modification in the pulse welding process illustrated in FIGS. 10-12 wherein the background is adaptively adjusted.
Figure 14:
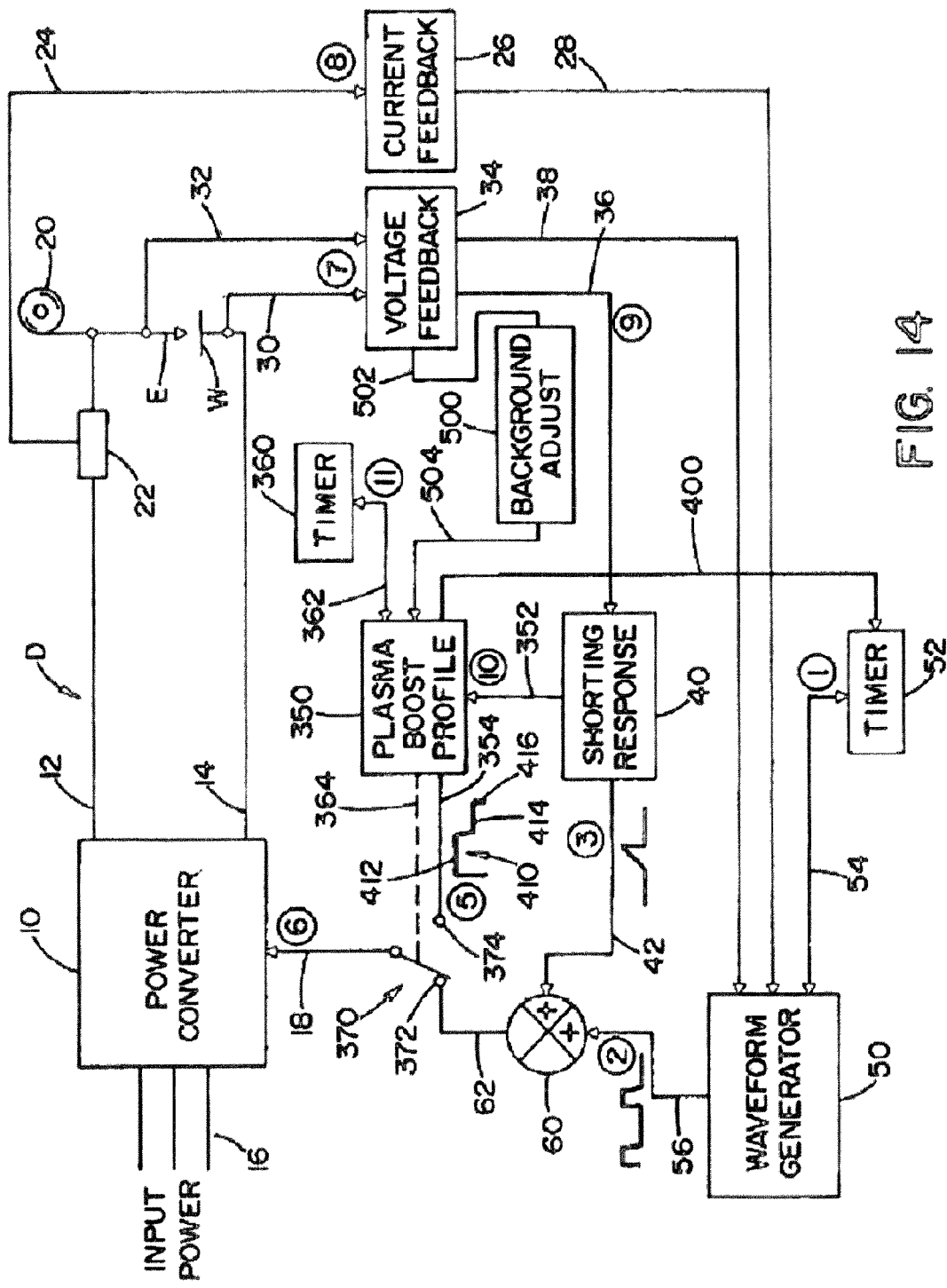
FIG. 14 is a combined block diagram and wiring diagram of an electric arc welder for performing the adaptive procedure illustrated in FIG. 13.
Figure 15:
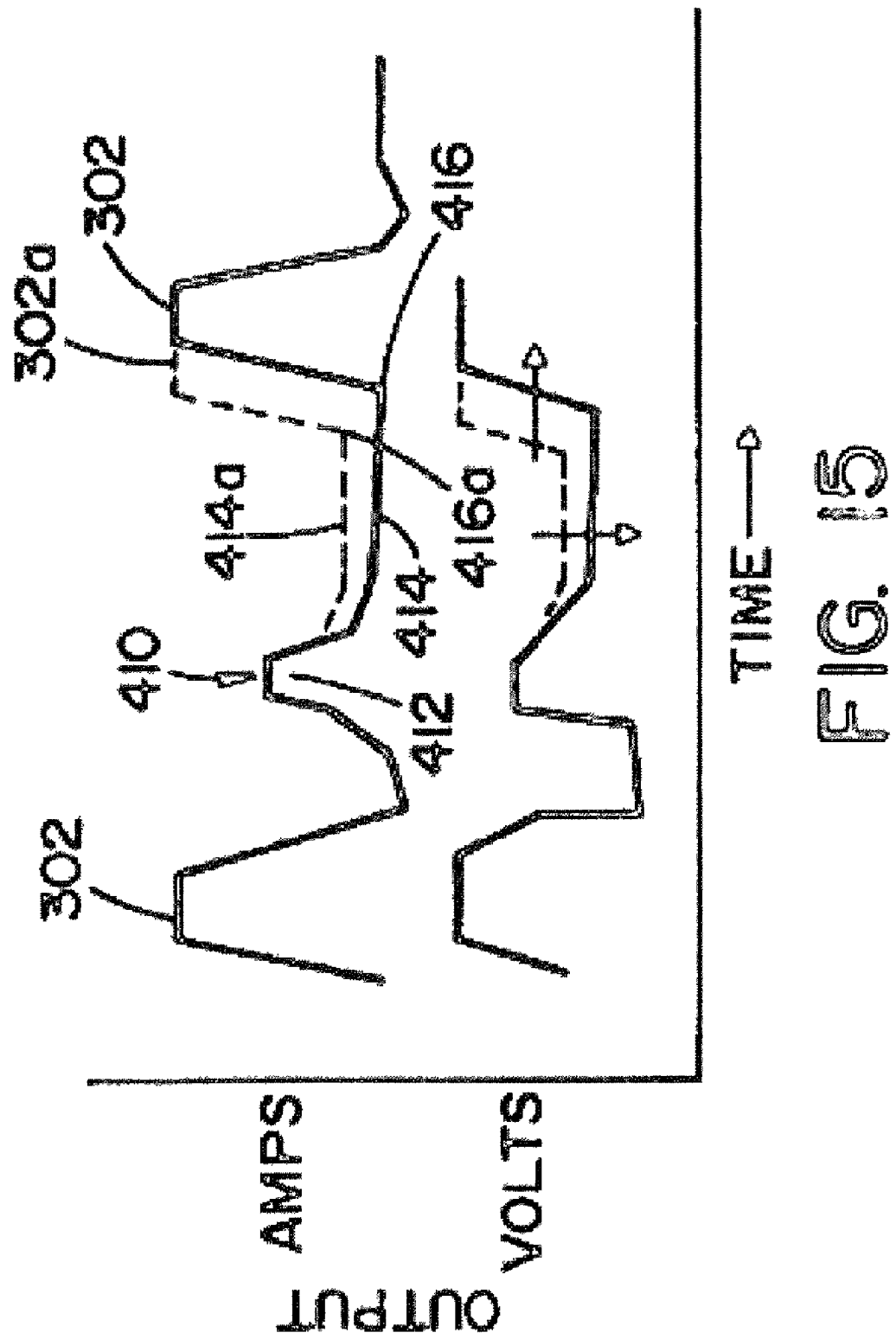
FIG. 15 is a graph similar to FIG. 13 illustrating the adaptive feature of the welding process.

A slight modification of the embodiment illustrated in FIGS. 10-12 is disclosed in FIGS. 13-15. Molten metal M formed on the end of the electrode after the plasma boost pulse will vary according to certain conditions during the plasma boost pulse. Consequently, a feedback loop sensing the arc voltage during the plasma boost pulse can be used to adjust the dedicated background segment 414. The arc voltage during the plasma boost pulse indicates the arc length during the pulse. This arc length is used to calculate background current portion amplitude and/or duration. Since the plasma boost is defined as a function of power, the voltage feedback is used to calculate the relative arc length and modify the background amplitude and/or duration. Adapting the background amplitude and duration will promote even more consistency of the electrode placement with regard to the puddle after a short circuit. An independent adaptive control is used in welder D shown in FIG. 14. This adaptive loop modifies background portion 414 in accordance with the sensed arc voltage occurring during the pulse portion 412 of waveform 410. The gain of this second adaptive control loop must be set so that the short plasma boost will directly affect the next background current segment. Consequently, only the background current amplitude and duration for the interrupt being processed is adapted. Thus, electric arc welder D allows the plasma boost to be controlled by an arc voltage feedback loop. To this end, adjustment of the amplitude and duration of the background portion 414 is accomplished by circuit 500 having an input 502 representing the arc voltage from voltage sensor 34. Output 504 is communicated with the plasma boost circuit to adjust the background portion during the interrupt determined by the time switch 370 is in the interrupt position 374. This concept is best illustrated by a comparison of FIG. 13 and FIG. 15. In FIG. 13, the background portion 414 (normally current) is a fixed profile, as previously described. Voltage from line 502 in FIG. 14 adjusts portion 414 into the dashed line configuration of FIG. 15 where the new background portion 414a of waveform 410 terminates at a new point 416a. Portion 414a is adjusted by the arc voltage during pulse portion 412, which voltage essentially corresponds to the arc length during the plasma boost pulse portion of waveform 410. Otherwise, electric arc welder D shown in FIG. 14 is the same as welders A, B and C, as previously described.

Figure 16:
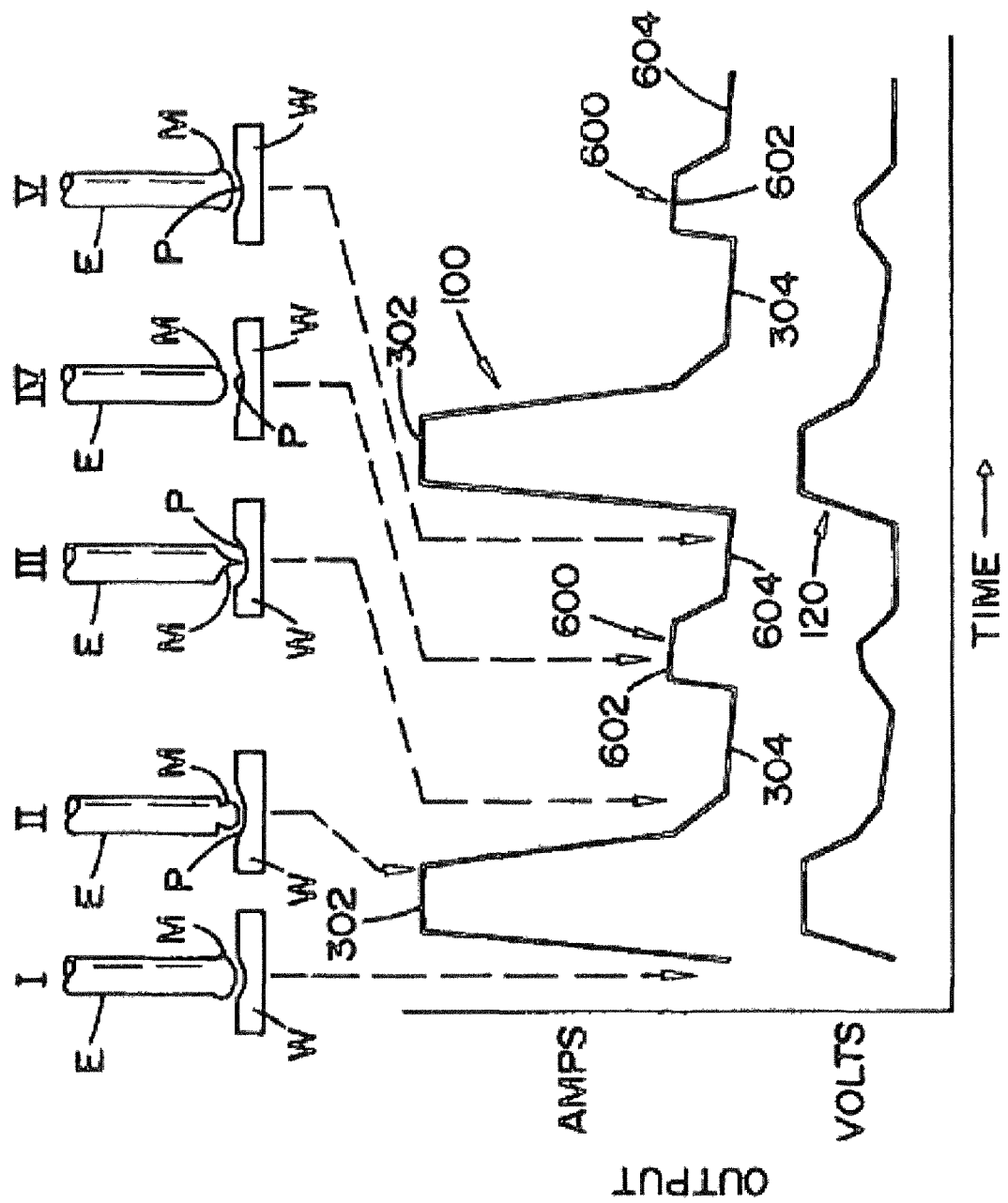
FIG. 16 is a graph including a voltage curve and a current curve of a pulse welding process incorporating a plasma boost and background segment between each pulse of the pulse welding process.
Figure 17:
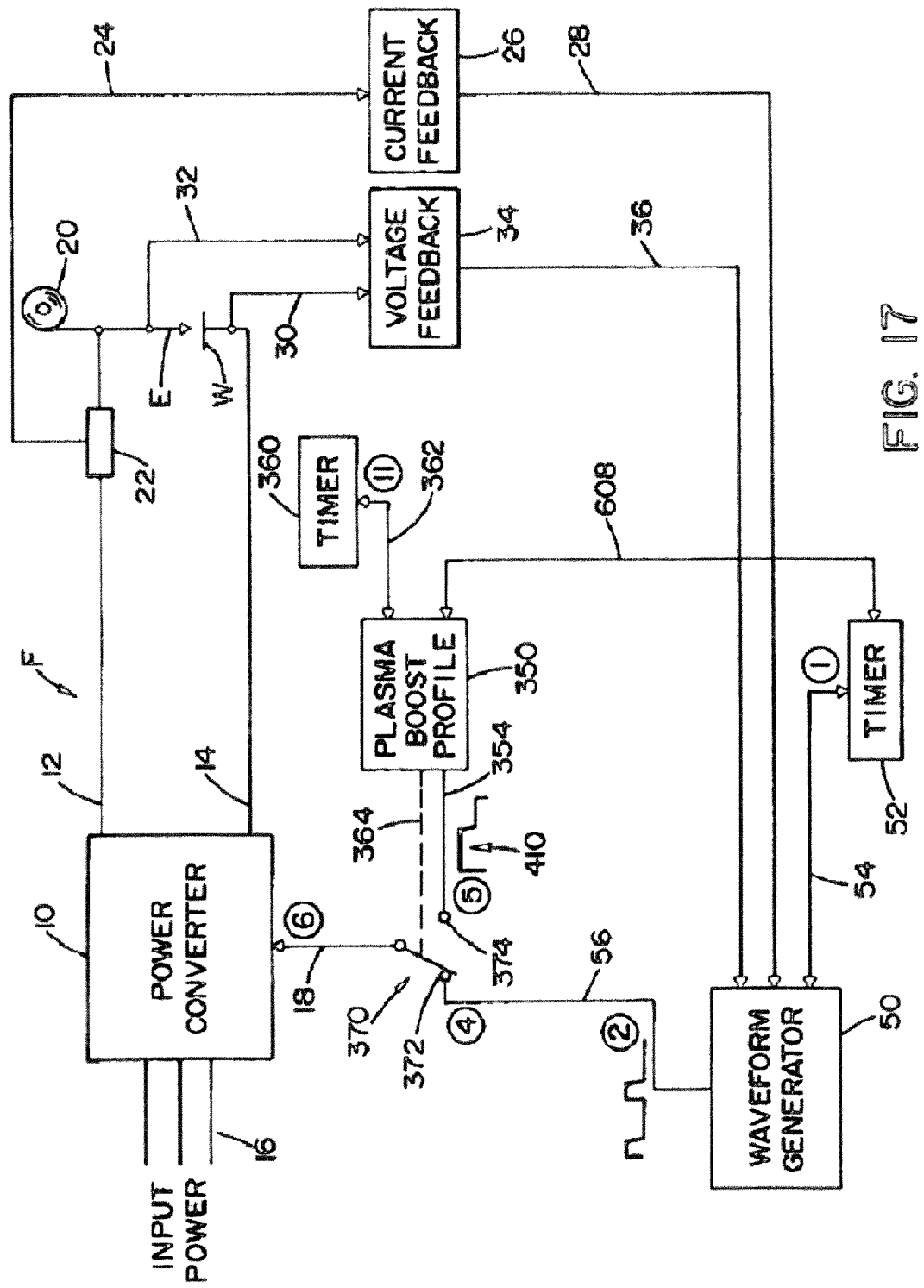
FIG. 17 is a combined block diagram and wiring diagram showing an electric arc welder for performing the pulse welding process illustrated in FIG. 16.
Figure 18:
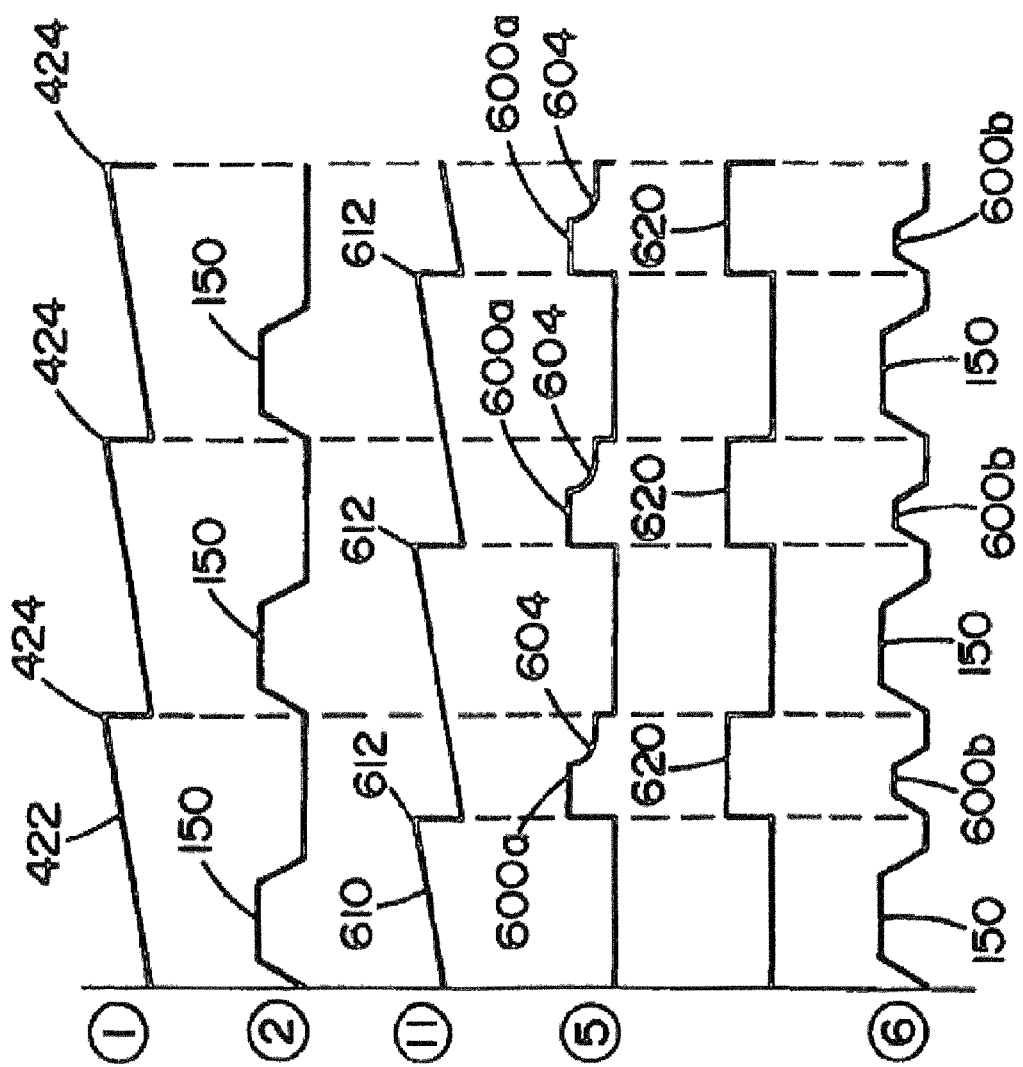
FIG. 18 is a graph illustrating signals at various locations in the electric arc welder of FIG. 17.

Another use of the plasma boost pulse is described in FIGS. 16-18. Plasma boost pulse 600 with a boost pulse portion 602 and background portion 604 is inserted between each pulse 302 of curves 100, 120 as shown in FIG. 16. In this manner, the plasma boost pulse preheats the end of the electrode and creates a droplet for the next pulse 302 for transfer to the molten metal puddle P. The first segment of the plasma boost pulse is a pulse that will preheat the end of the electrode and create a droplet. This preheat has been advantageously used in GMAW-pulse welding using non-ferrous metals, such as nickel alloys and titanium. In this process of a boost pulse between each standard pulse, metal cored wires and flux cored wires, as shown in FIGS. 4 and 5, have been used to provide FCAW-G and FCAW-S welding processes. The process is implemented by electric arc welder F which differs from welder C shown in FIG. 11 by removing the shorting response circuit 40 and providing a two way reset line 608. The output of plasma boost profile circuit 350 is the fixed waveform 410 directed to input 18 when switch 370 is shifted to the interrupt position 374 by the logic on line 364. This line is signal 11 shown in FIG. 18 where timer 360 times along portion 610 until it reaches its set count at point 612. Interrupt pulse 620 is in existence when switch 370 is held in the interrupt position 374. The interrupt is started at time 612 when timer 360 starts. When the timer starts at time 612, the output on line 354 is a waveform with profile 600a shown in FIG. 18. Timer 52 starts the next pulse 150 at time 424 and terminates interrupt 620 at this time. Thus, during interrupt 620 waveform 600a is directed through line 354 to input 18. Thus, signal 6 alternates between signal 2 from waveform generator 50 and fixed pulse profile shape 600b corresponding to waveform 410 in line 354. During the time between timer resets, the interrupt is being processed to drive power source by input 18 from circuit 350. Thus, a plasma boost pulse 600 is routinely implemented between the normal pulse 302 by power source 10. The operation of this use of the power boost pulse is best illustrated at the upper portion of FIG. 16 where electrode E is melted so that molten metal M is transferred to workpiece W between positions I and II. Then, in accordance with standard pulse welding technology, molten metal M is transferred to puddle P of workpiece W as shown in position III. At position IV waveform 600 including a high power plasma boost is implemented between electrode E and workpiece W. This waveform causes action of puddle P shown in position IV. When the fixed background portion 604 of plasma boost pulse waveform 600a is applied through the arc, puddle P recedes toward the molten metal M and awaits the next transfer pulse 302. This is shown at position V. The pulse portion of waveform 600a will heat the end of the electrode and create a molten droplet that is transferred during the next pulse. This method can be used alone or in combination with the timing sequence shown in FIG. 18. Other arrangements can be used to insert a plasma boost pulse between the standard current pulses 302 from waveform generator 50. Welder F could have the background adjustment feature of welder D as shown in FIG. 14 as an option. In accordance with an embodiment of the present invention, the tailout for waveform 600a is fixed. Adaptive feedback from the voltage or arc length is optional.

Figure 23:
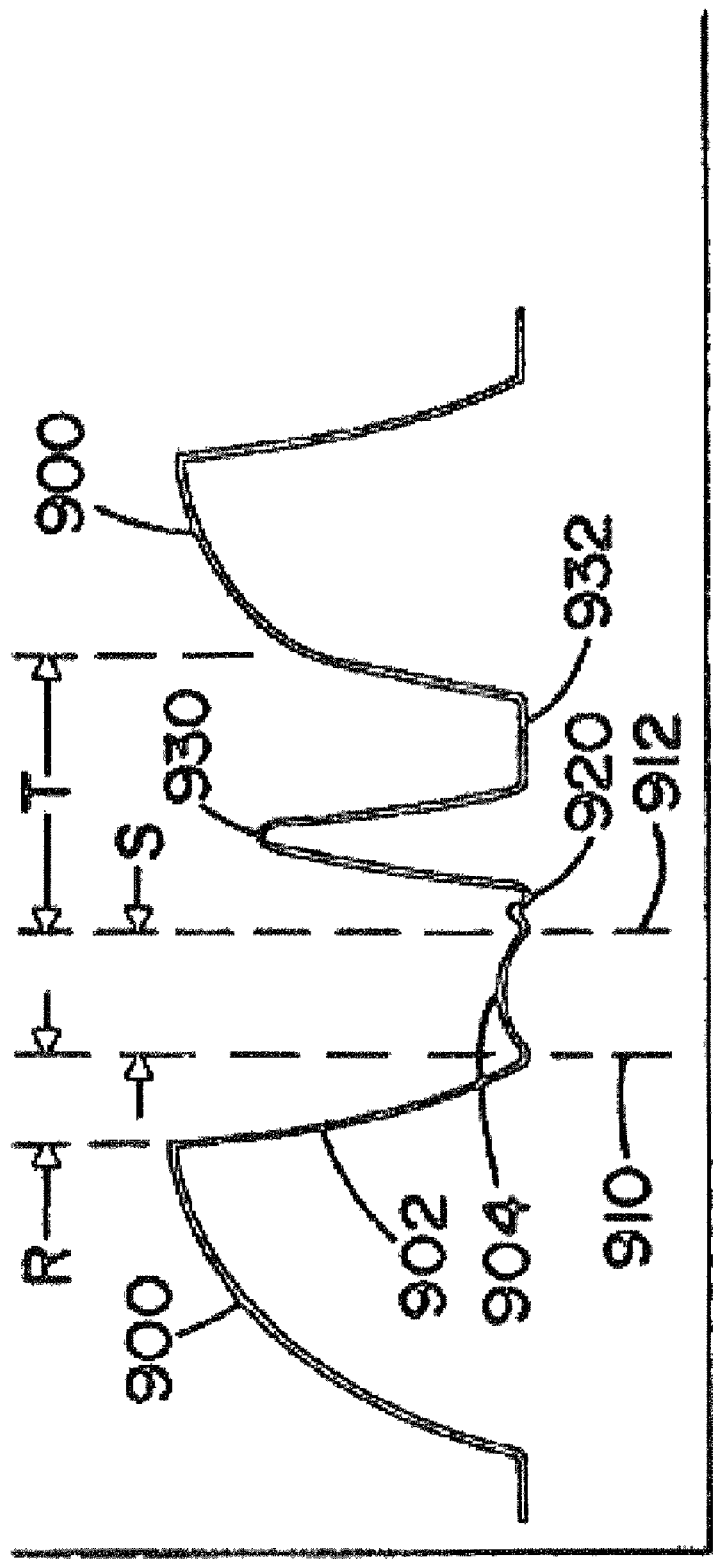
FIG. 23 is a current curve showing a practical waveform when using the welder as shown in FIGS. 16-18.

FIG. 23 is a current curve of the practical implementation of the process where a plasma boost pulse is created between each pulse of a standard pulse welding process. A short circuit at point 910 occurs after each pulse 900. This short circuit is not at the peak of pulse 900, but is after decay portion 902. The short is cleared naturally by the rhythmic movement of the puddle to create a current hump 904. There is a delay before the short circuit clearance routine increases the current as so far explained. If the short circuit is cleared naturally before the delay expires, there is no clearing current increase. Thus, the short is often cleared at point 912 before there is a rush of short clearing current. This second signal at point 912 is the trailing edge of pulse 140 in signal 9 as shown in FIG. 9. When the second signal is created from voltage sensing device 34, the short is cleared and plasma boost pulse 930 is created. Because of inherent time delays in the circuitry, there is a slight time delay 920 between the second signal at point 912 and start of pulse 930. Thereafter, background current 932 continues to the next pulse. The slight delay before clearing current would be before creation of pulse 142 in FIG. 9, but during the short the delay may be greater than the time to clear the short naturally. If the short is cleared before the delay has expired, then the welder goes directly into the plasma boost with its inherent delay 920. During pulse 900, there is a sudden increase in current to increase the arc energy to form and squeeze a molten droplet extending from the end of the electrode. During time R, the pulse is ramped down to relax the plasma force depressing the molten puddle. This allows the puddle to rise toward the droplet. When there is a short at point 910, the droplet has contacted the puddle. As soon as the short terminates at point 912, a gentle plasma boost pulse pushes the puddle away and conditions the electrode tip. This assures reliable separation of the metal from the tip and the puddle resulting in a stable rhythm of the cycles. The delay before the clearing current allows the short to clear by the rhythm and not by a clearing current. If it does not clear during the delay, then the standard current clearing routine is implemented. The second signal at point 912 informs the controller that the short has been cleared whether naturally or by a clearing current. Then the plasma boost pulse is outputted. This is the practical operation of the welder in FIGS. 16-18.

Figure 19:
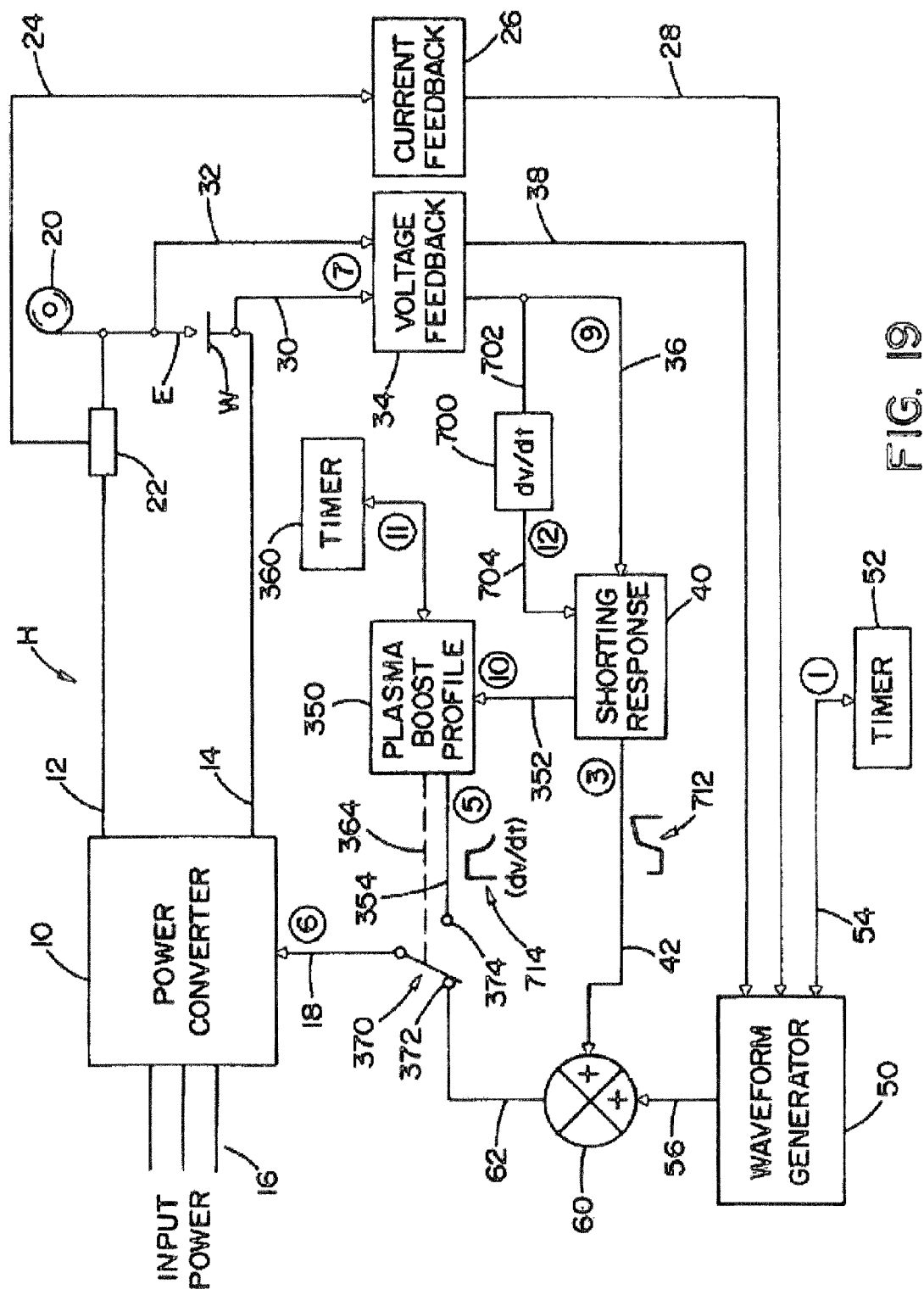
FIG. 19 is a combined block diagram and wiring diagram of an electric arc welder for performing the pulse welding process explained in FIGS. 20 and 21.
Figure 20:
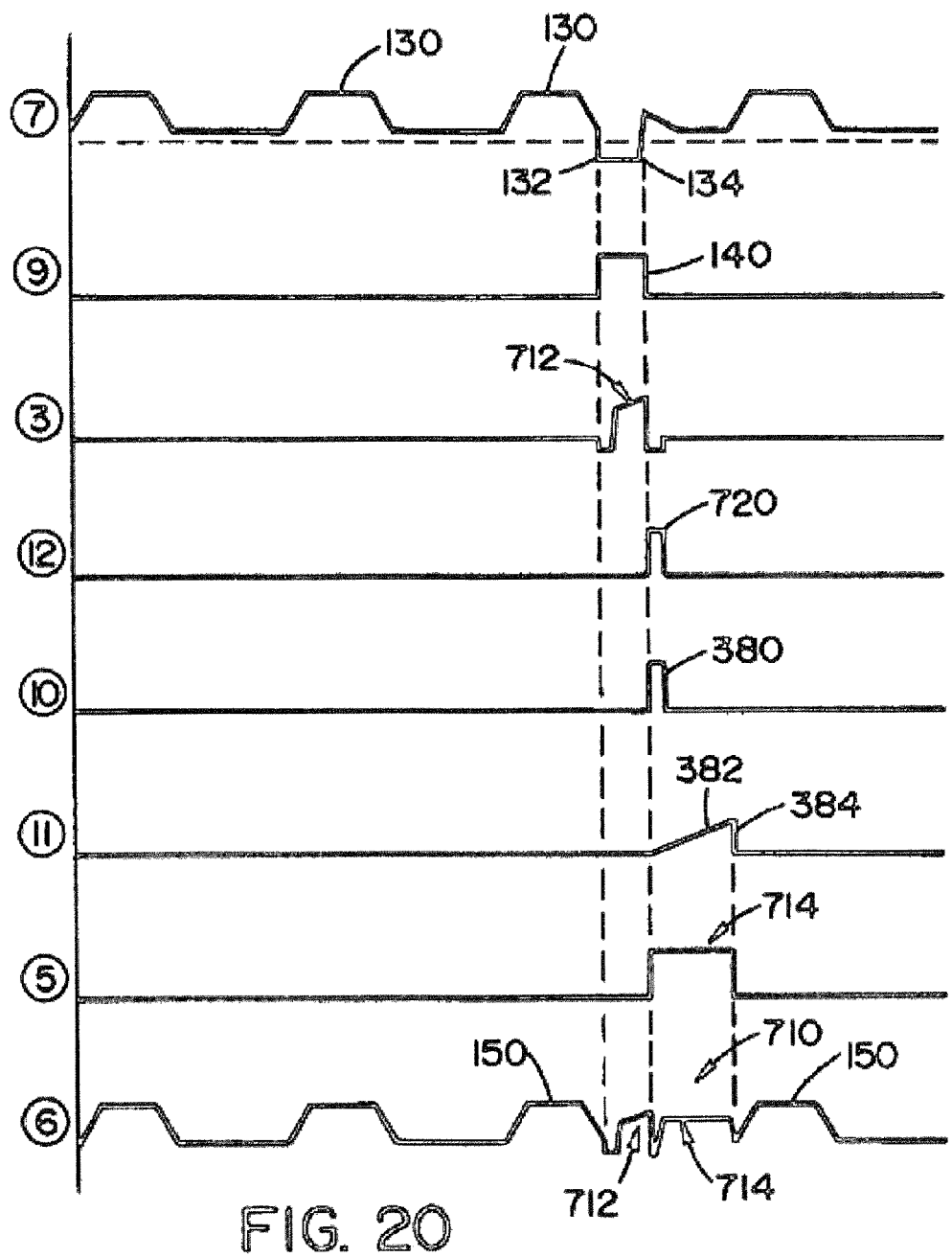
FIG. 20 is a graph showing signals at various locations in the welder illustrated in FIG. 19.
Figure 21:
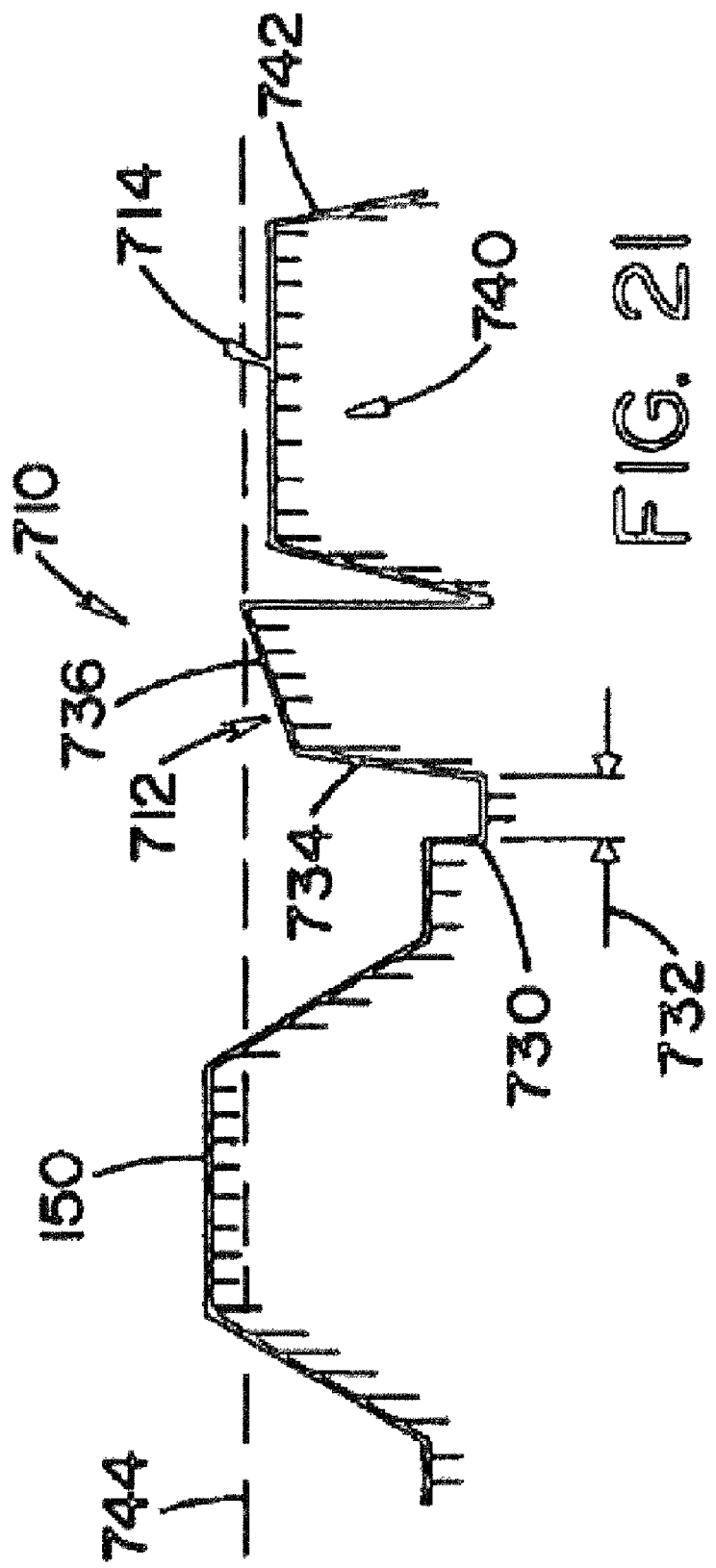
FIG. 21 is an illustration of the waveform using the welder shown in FIG. 19 and the signals of FIG. 20.

The use of a waveform including a plasma boost pulse portion with a different short circuit clearing routine is another aspect of the present invention and is shown in FIGS. 19-21. Welder G is similar to welder C disclosed in FIG. 11 with the addition of a standard premonition circuit 700 with an input 702 and an output 704. A logic on the output indicates when the dv/dt of the arc voltage from sensor 34 exceeds a given level indicating an impeding short circuit during the clearance routine for a short circuit. The dv/dt circuit is standard and detects a slope equal to or greater than a reference value signaling the short is about to break. This circuit stops the shorting response circuit 40 so that the signal in line 325 terminates the arc portion 712 of waveform 710 shown in FIG. 21 and initiates the plasma portion 714 on output 354 of plasma boost profile circuit 350. The output 704 of premonition circuit 700 is shown as pulse 720 in signal 12, one of the many number signals of welder G shown in FIG. 20. The various numbered signals in FIG. 20 correspond to the numbers used in FIG. 19. Welder G generates the signals shown in FIG. 20, which signals are essentially the same as the like numbered signals illustrated in FIG. 11 for welder C. The basic difference between welder G and welder C relates to short clearing portion 712 of waveform 710. When the short occurs at point 132 shown in FIG. 20, waveform portion 712 of waveform 710 is implemented by the shorting response circuit 40. This portion of the waveform is different and includes a immediate reduction in current at the time of the short represented by portion 730. Circuit 40 holds the current low for a preset time 732, after which a clearance routine for the short circuit is implemented. This routine starts with a rapid increase in current along slope portion 734 followed by a second slope portion 736 which is somewhat more gradual. As this current increase is directed through the short circuit, the short circuit begins to neck causing an increase in the dv/dt. When this derivative reaches a specific level pulse 720 is created. This pulse immediately plunges the current to a low level similar to the level at reduction point 730. The premonition relation can be dv/dt, di/dt, dp/dt or other derivatives of time. Reduction of current caused by pulse 720 also starts waveform portion 714 of general waveform 710 illustrated in FIG. 21. In another embodiment, waveform 710 is started by a break in the short circuit. Waveform portion 714 includes the plasma boost pulse 740 having a tailout portion 742. This tailout portion is more distinct in FIG. 19, but has a variety of configurations. Welder G utilizes a unique short circuit clearing procedure whereby the termination of the clearing routine is determined by the impending rupture of the short circuit, as opposed to a voltage detector employed in welder C. Otherwise, the clearing procedure is generally the same. The exception is the reduced current portion for time 732. Metal transfer line or current 744 is less than the peak current, but greater than the maximum current of the plasma boost pulse. When there is a short, the short circuit is cleared and a plasma boost pulse is initiated to force the molten metal puddle from the advancing electrode while the advancing electrode is forming a molten metal ball for the next transfer. By using waveform 710 shown in FIG. 21, transfer of metal by short circuit is not disruptive and may even be advantageous. Indeed, it has been found when using embodiments of the present invention that transfer by a short circuit process after each pulse 150 of the pulse welding process has some advantages. Consequently, a modification has been developed which relies upon transfer of metal by short circuit in a pulse welding process. This modification uses the plasma boost pulse and is described in FIG. 22.

Figure 22:
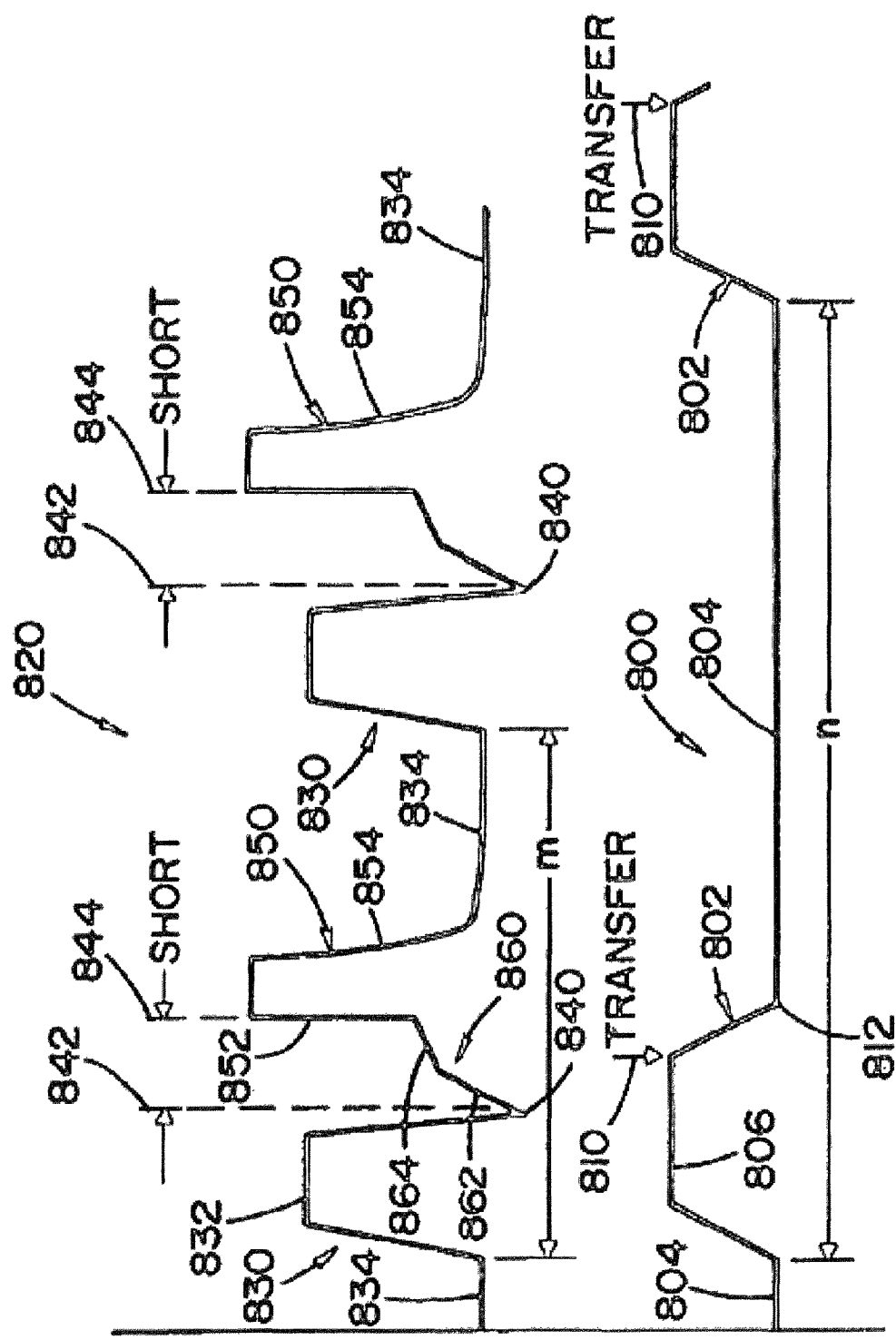
FIG. 22 is an illustration of a waveform obtained by using an embodiment of the present invention with control of the pulse welding process to assure a short circuit.

The use of the plasma boost pulse in a pulse welding process for the purpose of actually transferring metal by short circuit transfer, instead of the normal spray transfer is illustrated in FIG. 22. This aspect uses the elements from various electric arc welders so far described in detail. A normal pulse welding waveform is illustrated as curve 800 having pulses 802 separated by background current portions 804 and spaced to produce a period n. Each peak current stage 806 has a length or process time to melt the advancing electrode for the purposes of spray transfer as is normal. This transfer through the arc occurs at the end of the peak current stage and shown as point 810. Pulse 802 is intended to have enough energy to melt and propel a droplet of molten metal toward the workpiece. If this action does not occur, there will be a short circuit created when the molten metal ball on the end of the advancing wire contacts the molten metal of the puddle. This contact creates a short circuit indicated at point 812 to implement and bring into operation the method so far described where a short circuit creates a metal clearance routine and then provides the plasma boost pulse, with or without a controlled secondary background current. For the purposes of explaining the differences between a normal pulse welding process and the aspect shown in FIG. 22, the parameters of a representative normal pulse welding process using curve 800 are helpful.

Peak current 806 has a value of 550 amperes and a length of time of about 2.0 ms. Background current 804 has a level of 90 amperes while period n is about 8.3 ms. These parameters are representative of a pulse welding process to which aspects of the present invention have been added, as previously described. In FIG. 22, an embodiment of the present invention is used in a process that utilizes a short circuit condition to transfer the molten metal. This process can be employed due to the quiet puddle dynamics resulting from use of the embodiment. The new pulse weld process of FIG. 22 is illustrated by curve 820 where current pulses 830 are provided at a frequency which is increased as much as twice the frequency used in curve 800. With this high frequency, period m between pulses 830, when compared to a normal pulse welding process, can be reduced to about 4.3 ms. The template for the process depicted as curve 820 also has other modifications from the normal pulse welding curve 800. For instance, the peak current is reduced to a level, such as 475 amperes, and has a shortened time of 1.5 ms. These are representative parameters, but indicate that pulse 830 is not intended to actually separate the molten metal from the electrode and propel it toward the workpiece as done by pulse 802. Consequently, as the wire electrode is advancing toward the workpiece, pulse 830 merely forms a molten metal ball on the end of the wire. As the peak current is decreased, the molten metal ball on the end of the advancing wire progresses toward the molten metal puddle. In accordance with the illustrated embodiment of the invention shown in FIG. 22, the reduction of current after the peak stage 832 is below background current level 834 to a lower current point 840. This reduces the amount of arc force between the advancing molten metal ball and the molten metal puddle. The puddle, thus, rises toward the ball as the ball is moving toward the molten metal puddle. This causes a short circuit at point 842. This short circuit is detected as previously described. The embodiment of the present invention then creates waveform 850. This waveform includes a pulse portion 852 and a tailout portion 854. This waveform occurs during the plasma portion when there is an arc to initiate melting of the advancing wire preparatory to the next pulse 830. As previously described a clearing circuit is activated at point 842 to provide a clearance routine having two slope portions 862, 864. By using the embodiment disclosed in FIG. 22, curve 820 provides pulses at a higher frequency and with less energy in the pulses. A circuit activated at the end of a pulse plunges the arc current to assure a short circuit. Thus, a short circuit metal transfer is effected. The advantage of using the plasma boost waveform following termination of the actual short circuit allows the use of this pulse welding process.

The basic principles previously described herein with respect to pulse sequences including a high peak pulse, a short clearing segment, a plasma boost pulse, and metal transfer across a short circuit may be tailored or refined for the specific applications of building-up, cladding or hard-facing an alloyed metal onto a parent metal to provide resistance to corrosion, for example, or to provide resistance to wear. The standard practice of building-up, cladding or hard-facing an alloyed metal onto a parent metal typically results in too much ad-mixture from the parent metal into the weld metal. That is, the parent metal is diluted with the cladding or hard-facing metal, providing less corrosion resistance or less stand-up to wearing.

Figure 28:
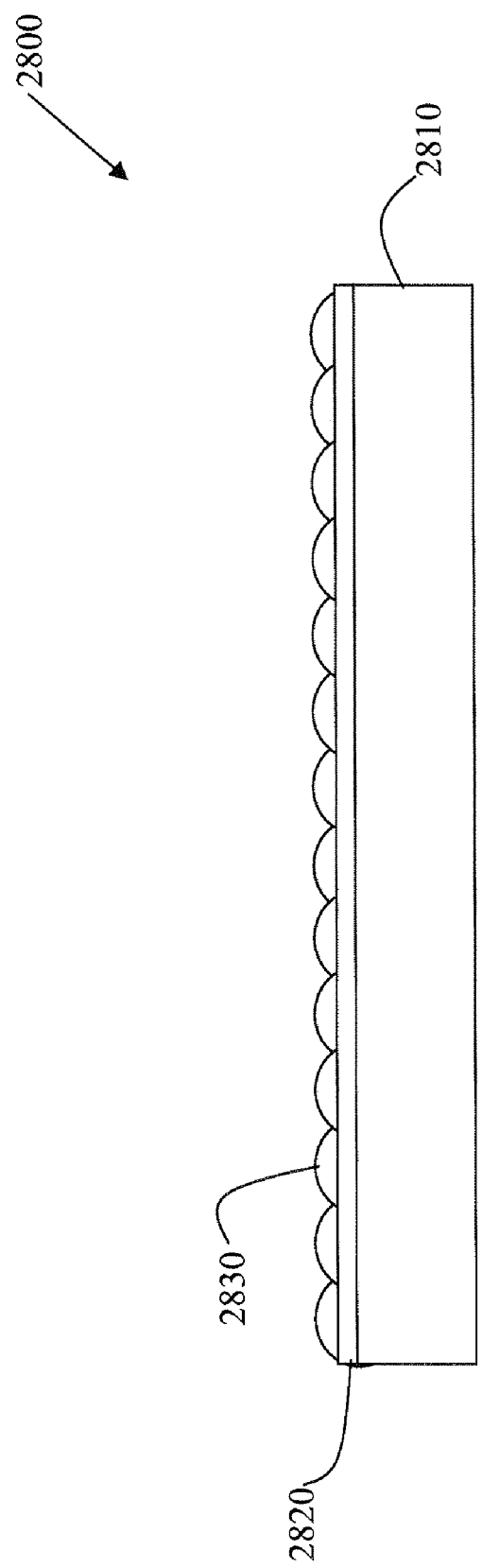
FIG. 28 illustrates an exemplary parent material clad with an alloyed cladding material.

FIG. 28 illustrates an exemplary parent material 2810 clad with an alloyed cladding material 2830. An admixture layer 2820 is produced between the parent material 2810 and the cladding material 2830 during the cladding process. The cladding material is from a wire electrode, for example. The resulting admixture is due to the reaction between or dilution of the cladding material and the parent metal during the cladding process.

For example, when cladding steel with a copper-nickel alloy, the cladding may crack when performed with a traditional pulse machine. This is because the ad-mixture of the copper from the electrode wire combines with the iron from the steel and forms a crack-sensitive alloy. By employing the principles described herein to provide a high frequency waveform with a high amplitude pulse, a low amplitude background current, and a special shorting routine, the problem of generating too much ad-mixture may be solved.

A fast transition from a peak current level toward a background current level along with a shorting response and a plasma boost pulse reduces the heat input required to achieve good metal transfer. A higher frequency also reduces the droplet size of molten metal between the electrode and the workpiece. The fast transition from the peak current level toward the background current level actually encourages a short circuit of molten metal to occur between the electrode and the workpiece, temporarily eliminating the arc. The traditional method transfers droplets across the arc. In accordance with an embodiment of the present invention, most of a droplet is transferred through the arc before the short occurs. However, the puddle comes up to the droplet and creates a short before the droplet is completely pinched off from the tip of the electrode when the current is dropped quickly. Surface tension then pulls the droplet into the puddle. A plasma boost pulse is then used to push the puddle down again and also to push up on the electrode and to begin to create a next droplet on the end of the electrode. This prevents a second short from occurring. If a second short were to occur, the electrode will have no melted area on its tip which makes operation unstable.

The methods as described herein with respect to FIGS. 24-27 allow the last part of the droplet to transfer across a low power short circuit (i.e., no arc). The voltage is zero volts (or near zero volts) during the short and, therefore, the power is zero (or near zero). The result is that the ad-mixture is reduced.

Figure 24:
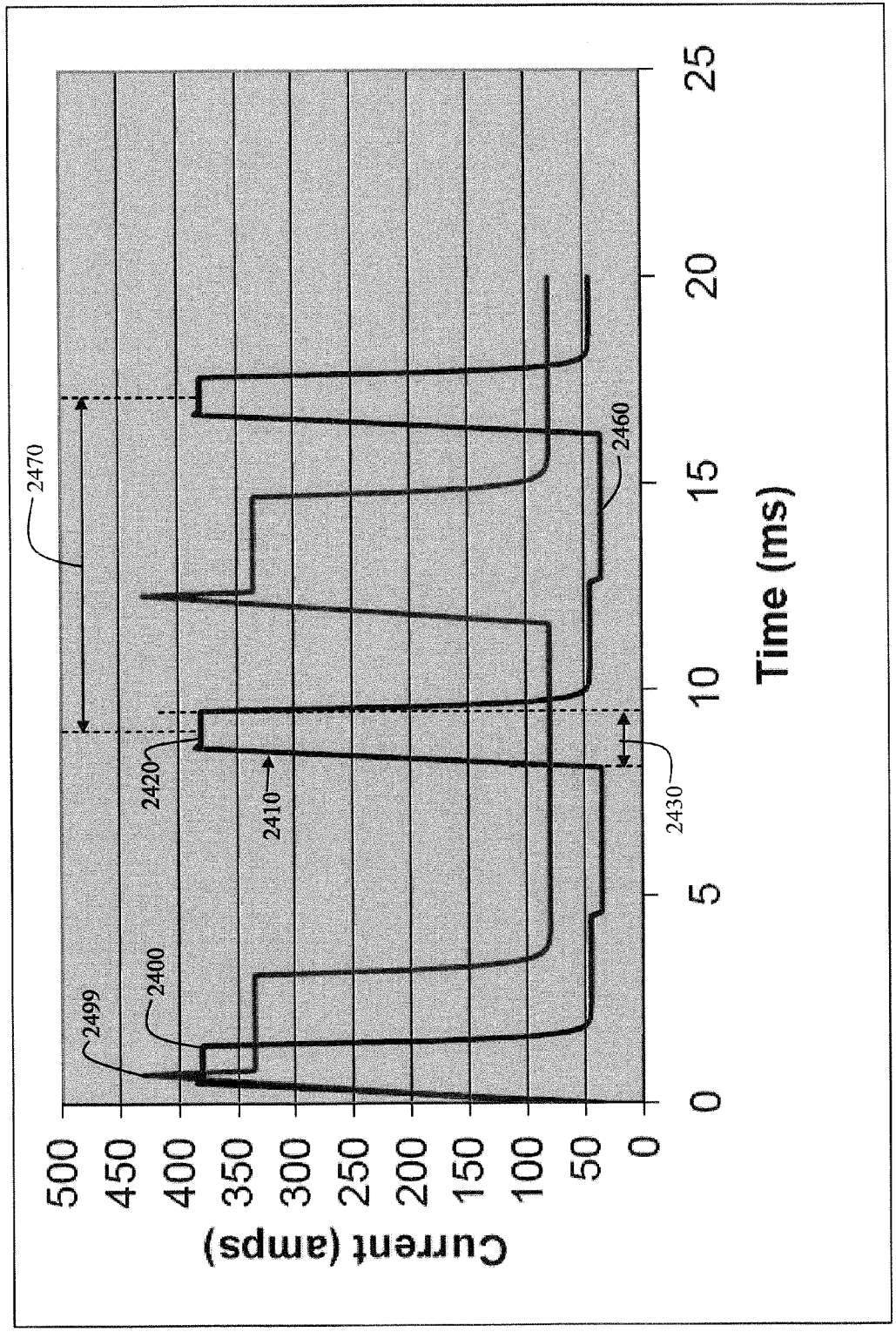
FIG. 24 is an illustration of a first exemplary embodiment of a portion of a periodic pulsed waveform generated by an electric arc device for use in building-up, cladding or hard-facing an alloyed metal onto a parent metal with minimal admixture by applying the waveform between an advancing electrode comprising the alloyed metal and a workpiece comprising the parent metal.

FIG. 24 is an illustration of a first exemplary embodiment of a portion of a periodic pulsed waveform 2400 generated by an electric arc device for use in building-up, cladding or hard-facing an alloyed metal onto a parent metal with minimal admixture by applying the waveform 2400 between an advancing electrode comprising the alloyed metal and a workpiece comprising the parent metal. FIG. 24 shows the case in which a short may not occur, even though the occurrence of a short is more desirable in the application of reducing or minimizing admixture.

The waveform 2400 is a current waveform as illustrated. The waveform 2400 includes a first peak pulse 2410 having a peak pulse current level 2420. The first peak pulse 2410 has a pulse duration 2430 defined, for example, from a beginning time zero of the pulse to a time corresponding to the end of the peak current level 2420. The period 2470 of the waveform 2400 defines the time between repeating portions of the waveform 2400. A more conventional waveform 2499 (which is not as good for reducing admixture) is also shown for comparison purposes.

The waveform 2400 is tailored for minimizing ad-mixture in the applications of building-up, cladding or hard-facing an alloyed metal onto a parent metal by providing a high peak pulse current level 2420 with respect to a low background current level 2460. The waveform 2400 may increase toward the peak pulse current level 2420 at a rate of, for example, 700 amps per millisecond for about half a millisecond. The low background current level 2460 may be less than 15% of the high peak pulse current level 2420. Also, the transition from the peak pulse current level 2420 toward the background current level 2460 may occur at a rate of at least 400 amps per millisecond. The voltage level corresponding to the peak pulse current level 2420 is also kept relatively low. Furthermore, the pulse duration 2430 is a relatively small fraction of the period 2470. Such a relatively small pulse duration keeps the energy in the pulse relatively low, reducing the heat input such that good cladding transfer is achieved and admixture is reduced. In particular, the pulse duration 2430 may be less than 20% of the period 2470.

As an example, the peak pulse current level 2420 may be 380 amps at a peak voltage level of 24 volts, and the background current level 2460 may be 45 amps. The pulse duration 2430 may be 1.4 milliseconds and the period may be 8.0 milliseconds. Such a relatively small pulse duration 2430 and a fast transition toward the background current level (e.g., at 500 amps per millisecond) achieves the desired result. Under such conditions, a rate of advancement of the electrode may be, for example, 200 inches per minute or more using a wire electrode made of copper/nickel and having a diameter of about 1.2 mm.

Figure 25:
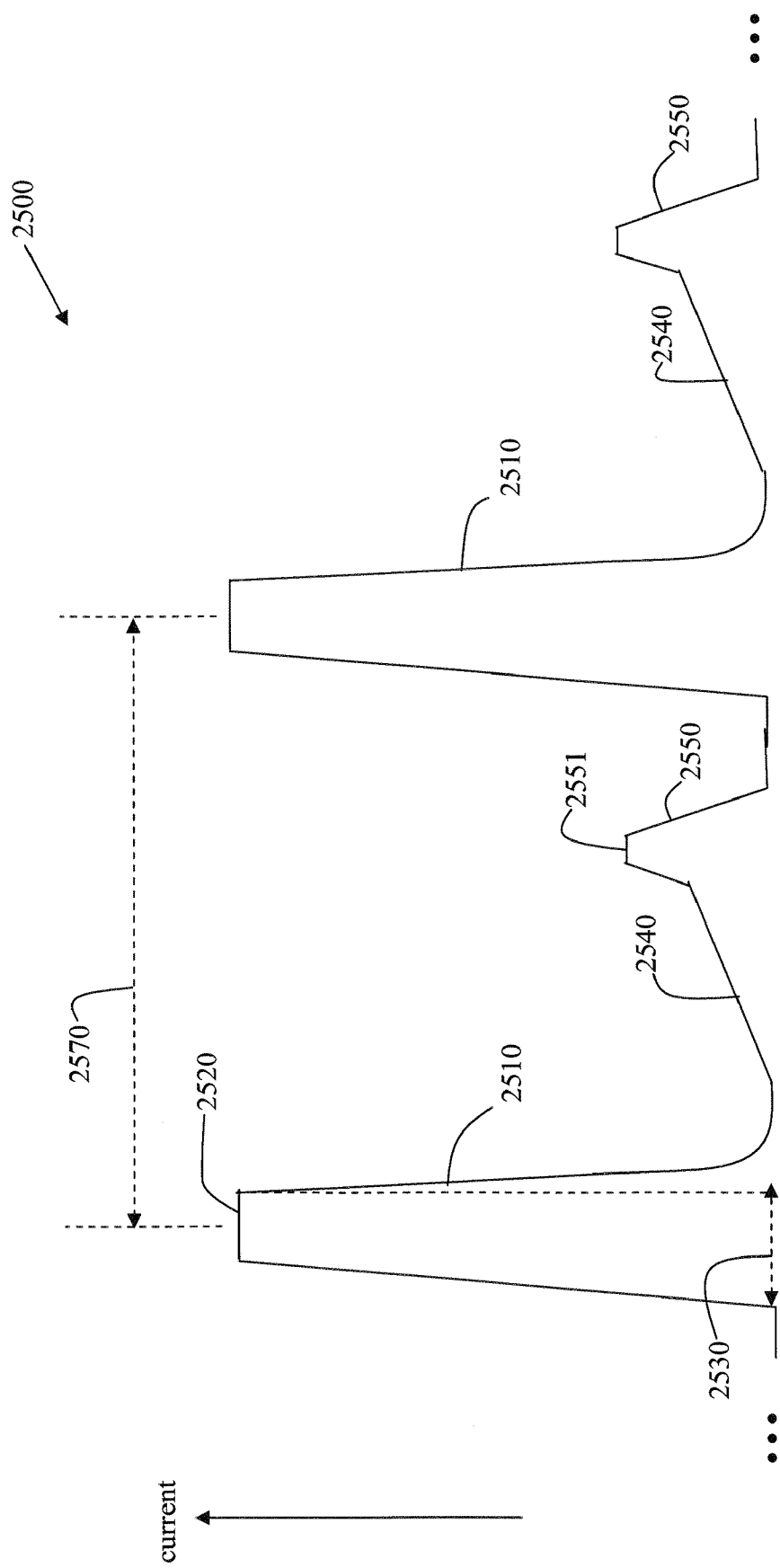
FIG. 25 is an illustration of a second exemplary embodiment of a portion of a periodic pulsed waveform generated by an electric arc device for use in building-up, cladding or hard-facing an alloyed metal onto a parent metal with minimal admixture by applying the waveform between an advancing electrode comprising the alloyed metal and a workpiece comprising the parent metal.

FIG. 25 is an illustration of a second exemplary embodiment of a portion of a periodic pulsed waveform 2500 generated by an electric arc device for use in building-up, cladding or hard-facing an alloyed metal onto a parent metal with minimal admixture by applying the waveform 2500 between an advancing electrode comprising the alloyed metal and a workpiece comprising the parent metal.

Again, the waveform 2500 is a current waveform as illustrated. The waveform 2500 illustrates the more desirable case in which a short of molten metal occurs between the electrode and the workpiece. Inducing a short is desirable because the voltage between the electrode and the workpiece goes to zero and, therefore, the power or heat generated goes to zero during the time of the short, helping to minimize any resultant admixture. If the force pushing up on the electrode (due to the arc current) is less than the force of the electrode pushing down, then a short will tend to occur.

The waveform 2500 includes a first peak pulse 2510 having a peak pulse current level 2520. The first peak pulse 2510 has a pulse duration 2530 defined, for example, from a beginning time zero of the pulse to a time corresponding to the end of the peak current level 2520. The waveform 2500 also includes a short clearing ramp 2540 and a plasma boost pulse 2550 having a peak pulse amplitude 2551. The period 2570 of the waveform 2500 defines the time between repeating portions of the waveform 2500.

The waveform 2500 is tailored for reducing or minimizing ad-mixture in the applications of building-up, cladding or hard-facing an alloyed metal onto a parent metal, again by providing a high peak pulse current level 2520 with respect to a low background current level. The waveform 2500 may increase toward the peak pulse current level 2520 at a rate of, for example, 700 amps per millisecond for about half a millisecond. The low background current level may be less than 15% of the high peak pulse current level 2520. Also, the transition from the peak pulse current level 2520 toward the background current level may occur at a rate of at least 400 amps per millisecond.

Such a fast transition rate encourages a short of molten metal to occur between the electrode and the workpiece. The voltage level corresponding to the peak pulse current level 2520 is also kept relatively low. Furthermore, the pulse duration 2530 is a relatively small fraction of the period 2570. Such a relatively small pulse duration keeps the energy in the pulse relatively low, reducing the heat input such that good cladding transfer is achieved and admixture is reduced. In particular, the pulse duration 2530 may be less than 20% of the period 2570.

As an example, the peak pulse current level 2520 may be 380 amps at a peak voltage level of 24 volts, and the background current level may be 45 amps. When a short occurs, however, the background current level may or may not actually be reached before the short clearing ramp 2540 is employed. The pulse duration 2530 may be 1.4 milliseconds and the period may be 8.0 milliseconds. Such a relatively small pulse duration 2530 and a fast transition toward the background current level (e.g., at 500 amps per millisecond) achieves the desired result. Under such conditions, a rate of advancement of the welding electrode may be, for example, 200 inches per minute or more.

Figure 26:
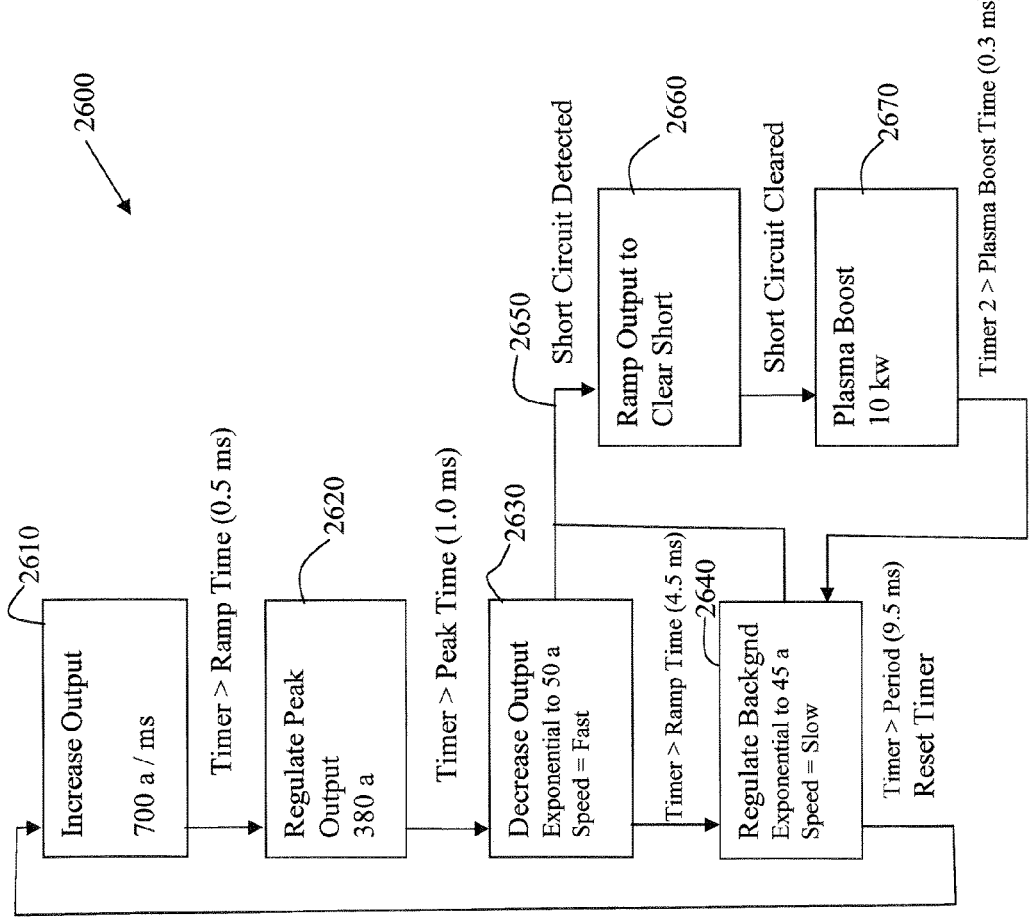
FIG. 26 is a flowchart of an exemplary embodiment of a method to build-up, clad or hard-face an alloyed metal onto a parent metal with minimal admixture using a series of pulses between an advancing electrode comprising the alloyed metal and a workpiece comprising the parent metal.

FIG. 26 is a flowchart of an exemplary embodiment of a method 2600 for building-up, cladding or hard-facing an alloyed metal onto a parent metal with minimal admixture using a series of pulses between an advancing electrode comprising the alloyed metal and a workpiece comprising the parent metal. In step 2610, increase an output current level over a first time segment while maintaining an arc between the advancing electrode and the workpiece. The fast increase in current quickly starts to pinch the molten droplet to quickly start the transfer of metal from the electrode to the work piece without introducing excessive heat. In step 2620, regulate the output current level to a peak current level over a second time segment while maintaining the arc between the advancing electrode and the workpiece. In step 2630, decrease the output current level from the peak current level toward a background current level in an attempt to induce a first short of molten metal between the advancing electrode and the workpiece. In step 2640, regulate the output current level to the background current level. In step 2650, determine in the first short occurred. In step 2660, ramp the output current level above the background current level, if the short has been determined to occur, until the short is cleared. In step 2670, pulse the output current level over a third time segment to prevent a second short from occurring directly after clearing the first short. The steps may be repeated at a pre-defined pulse repetition rate for the series of pulses.

As an example, referring to FIGS. 24-26, an output current of an electric arc device is increased at a rate of 700 amps per millisecond over approximately 0.5 milliseconds (a first time segment) to a peak pulse current level 2420 which is regulated to a peak current level of about 380 amps for about 1.0 millisecond (a second time segment). The output current level is then rapidly decreased in a substantially exponential manner (e.g., the output current level is cut in half every 0.1 milliseconds) in an attempt to induce a first short of molten metal between the advancing electrode and the workpiece. If the background current level 2460 is, for example, 45 amps, the output current level may be decreased most of the way toward the background current level 2460 to, for example, about 50 amps (i.e., just above the background current level). If a short does not occur, the output current level is simply regulated to the background current level 2460 as shown in FIG. 24, until the next peak pulse 2410 comes along. Rapidly decreasing the current level of the waveform to just above the background current level (e.g., to 50 amps) helps prevent the current level from under-shooting the background current level (e.g., falling below 45 amps) which can cause the arc to "pop out" and create undesirable effects in the building-up, cladding or hard-facing process. Regulating the current level to the background current level (e.g., from 50 amps to 45 amps) may be accomplished more slowly by, for example, reducing the current level by 10% every tenth of a millisecond.

If a short does occur and is detected, the output current level is ramped upward 2540 (see FIG. 25) until the short is cleared (i.e., until the molten drop separates from the electrode tip and is taken into the puddle on the workpiece). Once the short is cleared, the output current level is pulsed over a third time segment of about 0.3 milliseconds, generating a plasma boost pulse 2550 having a peak pulse amplitude 2551. The plasma boost pulse 2550 prevents a second short from occurring within the same cycle directly after the first short has occurred and helps condition the tip of the electrode for the next peak pulse (i.e., begins to melt the tip of the electrode). Again, inducing the short is desirable because the voltage between the electrode and the workpiece goes to zero and, therefore, the power or heat generated goes to zero during the time of the short, helping to minimize any resultant admixture.

Any of the electric arc welders of FIG. 8, FIG. 11, FIG. 14, and FIG. 19 herein may be adapted (e.g., programmed) to implement the method 2600. Other variations of electric arc devices may be used as well, in accordance with other embodiments.

For example, referring to FIG. 8, a means for generating a first pulse, at a period of repetition, having a peak pulse current level and a pulse duration that is less than 20% of the period of repetition comprises the combination of the waveform generator 50, the timer 52, and the power converter 10. A means for inducing a short of molten metal between the advancing electrode and the workpiece by reducing the peak pulse current level to about a background current level that is less than 15% of the peak pulse current level at a rate of at least 400 amps per millisecond comprises the combination of the waveform generator 50, the timer 52, and the power converter 10.

A means for generating a short clearing segment or ramp after the first pulse to clear the induced short comprises the combination of the voltage feedback sensor 34, the summing circuit 60, the shorting response circuit 40, and the power converter 10. A means for generating a plasma boost pulse after the short clearing ramp comprises the combination of the plasma boost profile circuit 350, the timer 360, and the power converter 10. A means for successively repeating the generating of the first pulse, inducing a short, generating the short clearing ramp, and generating the plasma boost pulse at a rate corresponding to the period of repetition comprises the timer 52.

Certain characteristics of the resulting waveform, for example 2400, may be affected by the length of the welding cables due to, for example, the inductance introduced by the welding cables. For example, the fall time toward the background current level may be negatively impacted (i.e., may become too large) if the inductance introduced is too high. A large fall time results in a reduced rate of change of current from the peak toward the background. Therefore, care should be taken when configuring the welding circuit path between the welding power source, the welding tool (e.g., welding torch and advancing wire), and the workpiece.

Figure 27:
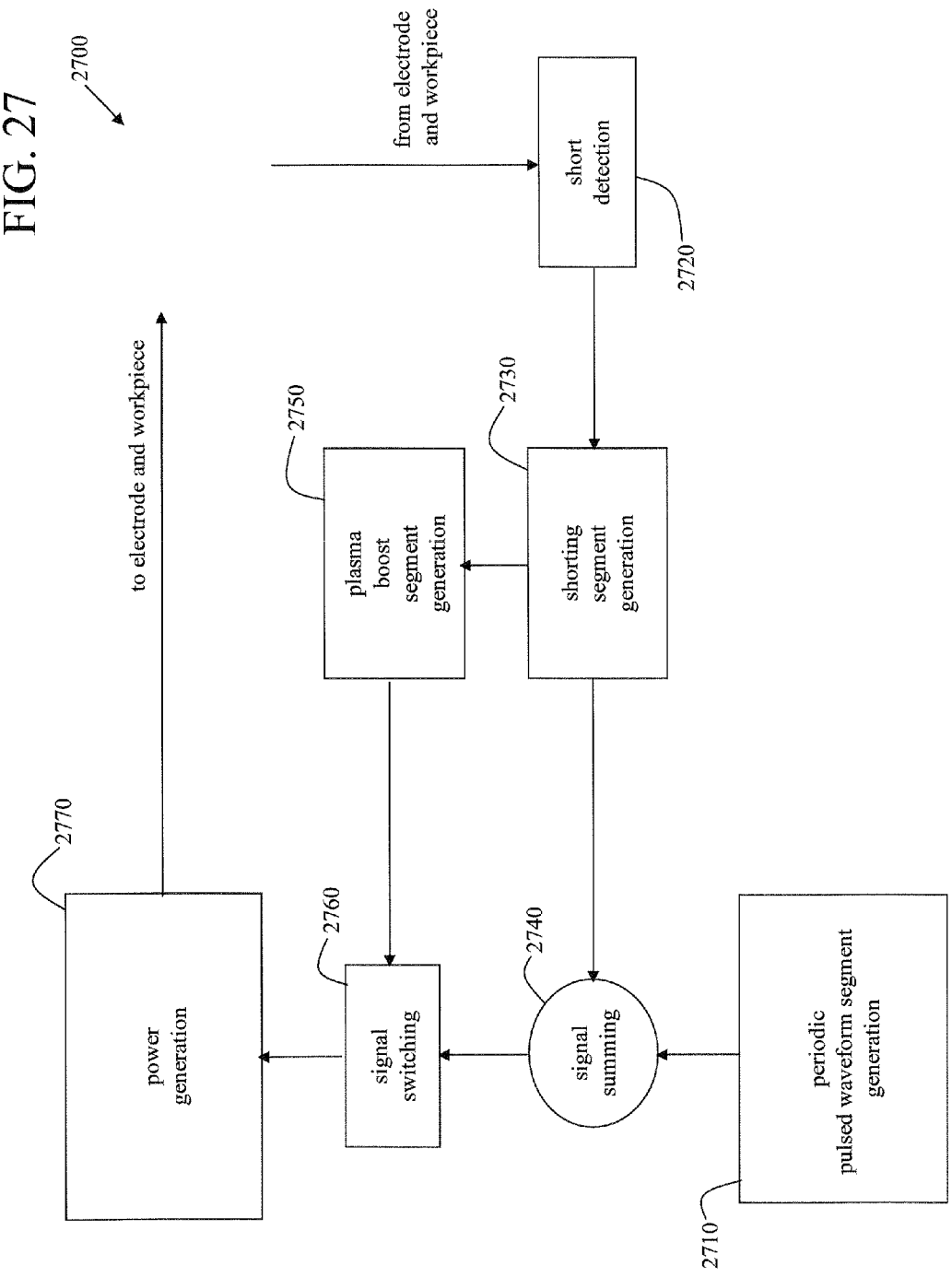
FIG. 27 is a simplified functional block diagram of an exemplary embodiment of an electric arc device for implementing the method of FIG. 26.

FIG. 27 is a simplified functional block diagram of an exemplary embodiment of an electric arc device 2700 for implementing the method 2600 of FIG. 26. The electric arc welder 2700 comprises periodic pulsed waveform segment generation functionality 2710 for generating and regulating high peak pulse current segments and background current segments at a pulse repetition rate. The periodic pulsed waveform segment generation functionality 2710 establishes the fast transition rate from a high peak pulse current level to a low background current level. The electric arc welder 2700 also comprises a short detection functionality 2720 for detecting shorts across the arc between the electrode and workpiece, and a short clearing segment generation functionality 2730 for clearing the detected shorts. The electric arc welder 2700 further comprises a signal summing functionality 2740 for summing signals resulting from the pulsed waveform segment generation functionality 2710 and the short clearing segment generation functionality 2730.

The electric arc device 2700 also includes a plasma boost segment generation functionality 2750 to generate a plasma boost pulse in response to clearing of a short. The electric arc welder 2700 further includes a signal switching functionality 2760 to allow switching between signals out of the signal summing functionality 2740 and signals from the plasma boost segment generation functionality 2750. The signal switching functionality 2760 directs the switched signals to a power generation functionality 2770 which generates the final composite power waveform (i.e., current waveform) that is provided to the electrode and workpiece during the building-up, cladding or hard-facing operation. The composite power waveform includes high peak pulse segments, background segments, short clearing segments, and plasma boost segments as previously described herein.

Several pulse devices and building-up, cladding and hard-facing methods have been described. Features of the various devices and methods may be combined or eliminated in accordance with the desires of the manufacturer and/or user. It is expected that certain modifications from one embodiment will be used in other embodiments that do not present technical inconsistencies.

In summary, an electric arc device and methods of using the electric arc device to build, clad, or hard-face an alloyed metal onto a parent metal using a series of pulses between an advancing welding electrode and a workpiece comprising the alloyed metal and the parent metal are disclosed. The methods employed in the electric arc device provide a high frequency building-up, cladding or hard-facing waveform with a high amplitude pulse, a low amplitude background current, and a special shorting routine, to alleviate the problem of generating too much ad-mixture. A high frequency, a fast transition from a peak current level toward a background current level, along with a shorting response and a plasma boost pulse reduces the droplet size and reduces the heat input required to achieve good welding transfer.

While the invention has been described with reference to certain embodiments, it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiment disclosed, but that the invention will include all embodiments falling within the scope of the appended claims.

What is claimed is:

1. A method of cladding or hard-facing an alloyed metal onto a parent metal with minimal admixture by generating a series of electric arc pulses between an advancing electrode comprising said alloyed metal and a workpiece comprising said parent metal, said method comprising:
   (a) increasing an output current level above a background current level over a first time segment;
   (b) regulating said output current level to a peak current level over a second time segment;
   (c) decreasing said output current level from said peak current level toward said background current level in an attempt to induce a first short of molten metal between said advancing electrode and said workpiece;
   (d) regulating said output current level to said background current level;
   (e) remaining at said background current level when said first short is not detected as occurring;
   (f) when said first short is detected as occurring, ramping said output current level above said background current level, until said first short is cleared at a ramped output current level;
   (g) generating a plasma boost pulse immediately upon clearing said first short by pulsing said output current level above said ramped output current level, starting when said first short is cleared, over a third time segment to prevent a second short from occurring; and
   (h) repeating steps (a) through (g) at a pre-defined pulse repetition rate for said series of pulses.

2. The method of claim 1 wherein said increasing of an output current level occurs at a rate of about 700 amps per millisecond.

3. The method of claim 1 wherein said first time segment is about a half a millisecond.

4. The method of claim 1 wherein said peak current level is about 380 amps.

5. The method of claim 1 wherein said second time segment is about one millisecond.

6. The method of claim 1 wherein said decreasing of said output current level occurs at a rate of at least 400 amps per millisecond.

7. The method of claim 1 wherein said background current level is about 45 amps.

8. The method of claim 1 wherein said third time segment is about one third of a millisecond.

9. The method of claim 1 wherein said pre-defined pulse repetition rate is about 125 Hz.

10. The method of claim 1 wherein said advancing electrode advances at a rate of at least 200 inches per minute.

11. The method of claim 1 wherein said parent metal comprises steel and said alloyed metal comprises copper and nickel.

12. The method of claim 1 wherein a sum of said first time segment and said second time segment is less than 20% of a pulse period of said series of pulses.

13. The method of claim 1 wherein said background current level is less than 15% of said peak current level.

14. The method of claim 1 wherein a peak voltage level corresponding to said peak current level is about 24 volts.

15. An electric arc device used for cladding or hard-facing an alloyed metal onto a parent metal with minimal admixture by generating a series of electric arc pulses between an advancing electrode comprising said alloyed metal and a workpiece comprising said parent metal, said electric arc device comprising:

a waveform generator for repeatedly generating output welding waveforms having:
  a peak pulse segment having an output current level regulated to a peak current level and a pulse width, wherein said peak current level is above a background current level, and wherein said output current level is reduced to about said background current level at a first rate for inducing a first short of molten metal between said advancing electrode and said workpiece,
  a short clearing current segment ramping said output current level above said background level to clear said first induced short, wherein said first induced short is cleared at a ramped output current level, and
  a plasma boost segment pulsing said output current level above said ramped output current level, starting immediately when said first induced short is cleared, to prevent a second short from occurring after said first short.

16. The electric arc device a claim 15 further comprising a voltage feedback device to detect a voltage level between said electrode and said workpiece being indicative of said first short.

17. The electric arc device of claim 15 wherein said peak current level is about 380 amps and said pulse width is about 1.5 milliseconds.

18. The electric arc device of claim 15 wherein said background current level is about 45 amps and said first rate is at least 400 amps per millisecond.

19. The electric arc device of claim 15 wherein said output welding waveforms repeat about every 8 milliseconds.

* * * * *